US012219628B2

(12) United States Patent
Huang

(10) Patent No.: US 12,219,628 B2
(45) Date of Patent: Feb. 4, 2025

(54) INTERACTIVE METHOD, HEAD-MOUNTED DEVICE, INTERACTIVE SYSTEM AND STORAGE MEDIUM

(71) Applicant: GUANGDONG OPPO MOBILE TELECOMMUNICATIONS CORP., LTD., Dongguan (CN)

(72) Inventor: Kai Huang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 486 days.

(21) Appl. No.: 17/673,681

(22) Filed: Feb. 16, 2022

(65) Prior Publication Data

US 2022/0174764 A1 Jun. 2, 2022

Related U.S. Application Data

(63) Continuation of application No. PCT/CN2020/100566, filed on Jul. 7, 2020.

(30) Foreign Application Priority Data

Aug. 19, 2019 (CN) .......................... 201910765380.0

(51) Int. Cl.
*H04W 76/14* (2018.01)

(52) U.S. Cl.
CPC .................................. *H04W 76/14* (2018.02)

(58) Field of Classification Search
CPC ............... H04W 76/14; G02B 27/0081; G02B 2027/0118; G02B 2027/0178;
(Continued)

(56) References Cited

U.S. PATENT DOCUMENTS

2014/0253605 A1* 9/2014 Border ...................... G09G 5/10
345/690
2017/0192239 A1* 7/2017 Nakamura ........... G02B 6/0036
(Continued)

FOREIGN PATENT DOCUMENTS

CN          103607710 A       2/2014
CN          105044913 A  *   11/2015     ......... G02B 27/0172
(Continued)

OTHER PUBLICATIONS

English translation for CN 105044913 A (Year: 2015).*
(Continued)

*Primary Examiner* — Marisol Figueroa
(74) *Attorney, Agent, or Firm* — Sheppard, Mullin, Richter & Hampton LLP

(57) ABSTRACT

Provided are an interactive method, a head-mounted device (100), an interactive system (500), and a storage medium. The interactive method is applied in an interaction between the head-mounted device (100) and a mobile terminal (400). The head-mounted device (100) includes a first camera (310). The mobile terminal (400) includes a second camera (410). The interactive method includes: triggering the first camera (310) to transmit a connection request to the mobile terminal (400); and establishing a connection between the mobile terminal (400) and the head-mounted device (100) based on a consent request transmitted by the mobile terminal (400) via the second camera (410).

12 Claims, 14 Drawing Sheets

(58) Field of Classification Search
CPC .......... G02B 27/0172; G08C 2201/71; G08C 17/02; G08C 2201/20; G08C 23/04; H04Q 2209/43; H04Q 9/00; G06F 3/011; G06F 3/013; G06F 2203/012; G06K 7/10821

See application file for complete search history.

(56) References Cited

U.S. PATENT DOCUMENTS

| | | | |
|---|---|---|---|
| 2017/0359456 A1* | 12/2017 | Shrubsole | G06F 3/017 |
| 2018/0196510 A1 | 7/2018 | Liu et al. | |
| 2019/0204904 A1 | 7/2019 | Yi et al. | |

FOREIGN PATENT DOCUMENTS

| | | | |
|---|---|---|---|
| CN | 105739689 A | 7/2016 | |
| CN | 105739730 A | 7/2016 | |
| CN | 105933657 A | 9/2016 | |
| CN | 107135474 A | 9/2017 | |
| CN | 108307360 A | 7/2018 | |
| CN | 108566480 A | 9/2018 | |
| CN | 108919942 A | 11/2018 | |
| CN | 108965851 A | 12/2018 | |
| CN | 110062362 A | 7/2019 | |
| CN | 110502115 A | 11/2019 | |
| WO | 2016102336 | 6/2016 | |

OTHER PUBLICATIONS

First Office Action from corresponding Chinese Application No. 201910765380.0, dated Dec. 1, 2020. English translation attached.
International Search Report and Written Opinion date Oct. 12, 2020 in International Application No. PCT/CN2020/100566. English translation attached.
The Second Office Action from corresponding Chinese Application No. 201910765380.0, dated Apr. 15, 2021. English translation attached.
The Grant Notice from corresponding Chinese Application No. 201910765380.0, dated Jun. 16, 2021. English translation attached.
Extended European Search Report dated Oct. 4, 2022 received in European Patent Application No. EP 20855050.9.
Communication pursuant to Article 94(3) EPC for European application 20855050.9 mailed Apr. 11, 2024.

* cited by examiner

INTERACTIVE METHOD, HEAD-MOUNTED DEVICE, INTERACTIVE SYSTEM AND STORAGE MEDIUM

CROSS-REFERENCE TO RELATED APPLICATIONS

The present application is a continuation of International Application No. PCT/CN2020/100566, filed on Jul. 7, 2020, which claims a priority to and the benefit of Chinese Patent Application No. 201910765380.0, filed with China National Intellectual Property Administration on Aug. 19, 2019. The disclosures of the aforementioned applications are hereby incorporated by reference in their entireties.

FIELD

The present disclosure relates to the field of display technologies, and more particularly, to an interactive method, a head-mounted device, an interactive system, and a storage medium.

BACKGROUND

In the related art, electronic glasses, in cooperation with a computing system and an optical system, enable a user to see a virtual scene added to a real scene once the user wears the electronic glasses. That is, an interaction between the user and virtual scenes in a real world can be enhanced with the augmented reality (AR) technology.

SUMMARY

The present disclosure provides an interactive method, a head-mounted device, an interactive system, and a storage medium.

An embodiment of the present disclosure provides an interactive method. The interactive method is applied in an interaction between a head-mounted device and a mobile terminal. The head-mounted device includes a first camera. The mobile terminal includes a second camera. The interactive method includes: triggering the first camera to transmit a connection request to the mobile terminal; and establishing a connection between the mobile terminal and the head-mounted device based on a consent request transmitted by the mobile terminal via the second camera.

An embodiment of the present disclosure provides a head-mounted device. The head-mounted device is configured to interact with a mobile terminal and includes a first camera. The mobile terminal includes a second camera. The head-mounted device is configured to trigger the first camera to transmit a connection request to the mobile terminal; and establish a connection between the mobile terminal and the head-mounted device based on a consent request transmitted by the mobile terminal via the second camera.

An interactive method is provided. The interactive method is applied in an interactive system. The interactive system includes a head-mounted device and a mobile terminal. The head-mounted device includes a first camera. The mobile terminal includes a second camera. The interactive method includes: triggering, by the head-mounted device, the first camera to transmit a connection request to the mobile terminal; triggering, by the mobile terminal, the second camera to transmit a consent request; and establishing, by the head-mounted device, a connection between the mobile terminal and the head-mounted device based on the consent request.

An interactive system is provided. The interactive system includes a head-mounted device and a mobile terminal. The head-mounted device includes a first camera. The mobile terminal includes a second camera. The head-mounted device is configured to trigger the first camera to transmit a connection request to the mobile terminal, the mobile terminal is configured to trigger the second camera to transmit a consent request, and the head-mounted device is configured to establish a connection with the mobile terminal based on the consent request.

An interactive method is provided. The interactive method is applied in a mobile terminal. The interactive method includes: receiving a connection request initiated by a first camera of a head-mounted device under triggering of the head-mounted device; and transmitting, by a second camera of the mobile terminal, a consent request based on the connection request for establishing a connection between the head-mounted device and the mobile terminal.

A non-volatile computer-readable storage medium is provided. The storage medium includes computer-executable instructions. The computer-executable instructions, when executed by one or more processors, cause one or more processors to implement the interactive method according to any one of the above embodiments.

Additional aspects and advantages of the present disclosure will be provided at least in part in the following description, or become apparent at least in part from the following description, or can be learned from the practicing of the present disclosure.

BRIEF DESCRIPTION OF DRAWINGS

The above and/or additional aspects and advantages of the present disclosure will become more apparent and understandable from the following description of embodiments in conjunction with the accompanying drawings, in which.

REFERENCE NUMERALS OF MAIN COMPONENTS

Figure 1:
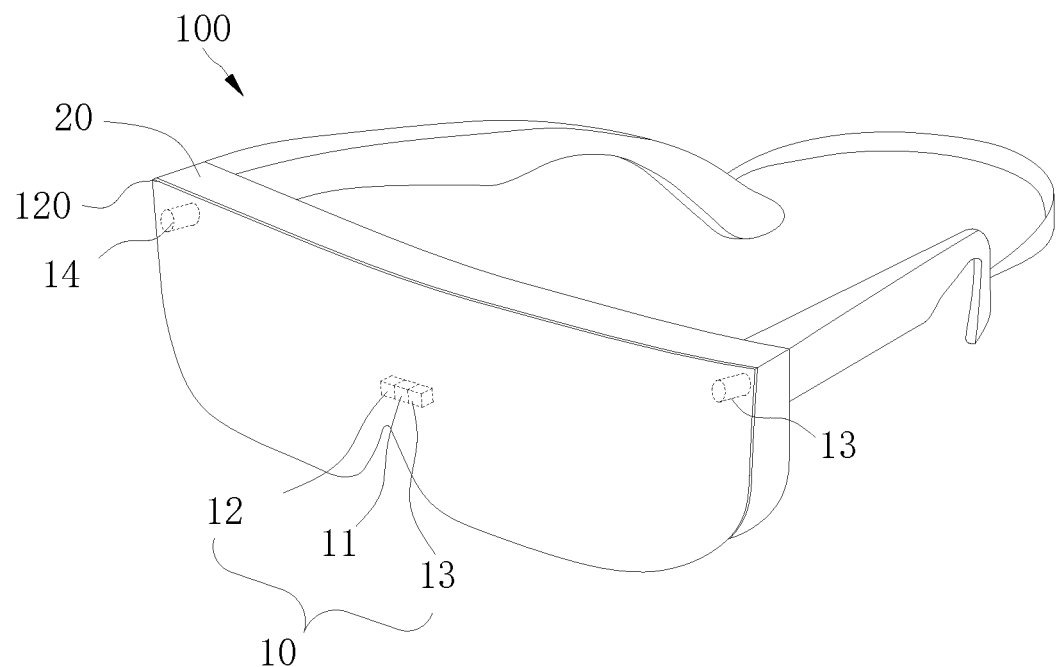
FIG. 1 is a schematic three-dimensional diagram of a head-mounted device according to an embodiment of the present disclosure.

Head-mounted device 100, sensor assembly 10, light-emitting component 11, encapsulation casing 111, first light-emitting source 112, second light-emitting source 113, substrate 114, diffuser 115, depth camera 12, environment camera 13, light sensor 14, electrochromic device 120, antireflection film 130, housing 20, inner surface 201, outer surface 202, aperture 203, light-transmitting portion 204, receiving chamber 22, top housing wall 24, bottom housing wall 26, notch 262, side housing wall 28, support component 30, first bracket 32, first bending portion 322, second bracket 34, second bending portion 342, elastic band 36, display 40, refractive component 50, refractive chamber 52, light-transmitting liquid 54, first film layer 56, second film layer 58, side wall 59, adjustment mechanism 60, chamber body 62, sliding groove 622, sliding member 64, driving component 66, knob 662, screw 664, gear 666, rack 668, adjustment chamber 68, light-guiding component 70, first side 71, second side 72, light quantity adjustment component 80, first conductive layer 81, second conductive layer 82, electrochromic layer 83, electrolyte layer 84, ion storage layer 85, processor 90, collimating component 92, driving chip 94;

Head-mounted device 300, first camera 310, first transmitting portion 311, identification code 320 of head-mounted device 300, input component 330, mobile terminal 400, second camera 410, second transmitting portion 411, second receiving portion 412, identification code 420 of mobile terminal 400, interactive system 500.

DESCRIPTION OF EMBODIMENTS

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and they are intended to explain, rather than limiting, the present disclosure.

Different embodiments or examples are provided below for implementing various structures of the present disclosure. To simplify the present disclosure, components and arrangements of specific examples are provided below. Of course, the components and arrangements are illustrative only, and they are not intended to limit the present disclosure. Furthermore, reference numerals and/or letters may be repeated in different examples of the present disclosure. Such a repetition is for the purpose of simplification and clearness, rather than indicating relationships between various embodiments and/or arrangements discussed herein. In addition, the present disclosure provides examples of various specific processes and materials, but applications of other processes and/or usages of other materials may be appreciated by those skilled in the art.

In the related art, a user usually wears a pair of electronic glasses on his or her head, and thus the user can only operate the electronic glasses through complicated operations due to the absence of input components such as keys and a touch screen, thereby resulting in poor user experience.

Referring to FIG. 1, an embodiment of the present disclosure provides a head-mounted device 100. For example, the head-mounted device may be a head-mounted display (HMD) device. After a user wears the HMD device, the HMD device can transmit optical signals to the user's eyes in cooperation with a computing system and an optical system, thereby realizing different effects such as virtual reality (VR), augmented reality (AR), mixed reality (MR).

Referring to FIG. 1, the head-mounted device 100 according to the embodiment of the present disclosure includes a sensor assembly 10, a housing 20, and an electrochromic device 120. The sensor assembly 10 is provided in the housing 20. The electrochromic device 120 is provided in the housing 20 and is arranged to correspond to the sensor assembly 10. The electrochromic device 120 covers the sensor assembly 10.

In the head-mounted device 100 according to the embodiment of the present disclosure, the electrochromic device 120 can change its light transmittance based on a state of the head-mounted device 100, to shield or expose the sensor assembly 10, thereby improving an appearance effect of the head-mounted device 100.

For example, the state of the head-mounted device 100 can be a working state and an off-working state. In the working state, the head-mounted device 100 can display images and play a video, audio, and other information to the user, and can execute operations from user. For example, the head-mounted device 100 can switch a display screen according to the user's operation. In an example, when the head-mounted device 100 is in the working state, if the sensor assembly 10 is activated, a light transmittance of the electrochromic device 120 can be controlled to increase, so as to expose the sensor assembly 10, thereby obtaining external information of the head-mounted device 100 or transmitting information to the outside of the head-mounted device 100. If the sensor assembly 10 is deactivated, the light transmittance of the electrochromic device 120 can be controlled to decrease, so as to shield the sensor assembly 10, thereby improving the appearance effect of the head-mounted device 100.

The sensor assembly 10 includes at least one of a light-emitting component 11, a depth camera 12, an environment camera 13, a proximity sensor (not illustrated), or a light sensor 14. As an example, the sensor assembly 10 includes the depth camera 12, and the proximity sensor or the light sensor 14. As another example, the sensor assembly 10 includes the depth camera 12 and the proximity sensor.

In an embodiment, the sensor assembly 10 includes a light-emitting component 11, a depth camera 12, an environment camera 13, and a proximity sensor. Accordingly, the light-emitting component 11, the depth camera 12, the environment camera 13, and the proximity sensor are all provided in the housing 20. The electrochromic device 120 covers the light-emitting component 11, the depth camera 12 and the environment camera 13, and electrochromic device 120 is configured to change its light transmittance to shield or expose at least one of the light-emitting component 11, the depth camera 12, and the environment camera 13.

Specifically, the light-emitting component 11 is configured to emit light. The light-emitting component 11 may emit visible light, or invisible light such as infrared light.

The environment camera 13 includes, but is not limited to, a color camera, an infrared camera, and a black and white camera. The head-mounted device 100 can capture an image of an object using the environment camera 13. In other words, the environment camera 13 is configured to obtain spatial environment information. The head-mounted device 100 can recognize a type of an object based on the image captured by the environment camera 13. For example, the head-mounted device 100 can recognize that the object is a human hand or a table based on the image captured by the environment camera 13. In addition, the head-mounted device 100 may generate a spatial environment map based on the spatial environment information obtained by the environment camera 13.

The depth camera 12 includes, but is not limited to, a Time of Flight (TOF) camera or a structural camera. The depth camera 12 can obtain a depth image of an object. The depth image, after being processed, can be used to obtain a three-dimensional model of the object, recognize an action, and the like.

The proximity sensor includes an infrared transmitter and an infrared receiver. The infrared transmitter and the infrared receiver cooperate with each other to detect a distance between an external object and the head-mounted device 100.

The light sensor 14 can be configured to detect ambient brightness, and the head-mounted device 100 can display an image with appropriate brightness based on the ambient brightness, thereby improving the user experience.

The sensor assembly 10 can be directly or indirectly arranged on the housing 20. In an example, the sensor assembly 10 is arranged on the housing 20 via a bracket. In other words, the sensor assembly 10 is fixed on the bracket, and the bracket is fixed on the housing 20. One or more sensor assemblies 10 can be provided. As illustrated in FIG. 1, the sensor assembly 10 includes a plurality of components, and the plurality of components can be provided at different positions of the housing 20, as long as the sensor assemblies 10 do not interfere with the normal use of the user.

It can be understood that the electrochromic device 120 may have different light transmittances corresponding to different applied voltages. In addition, the electrochromic device 120 can filter light of a predetermined color. For example, the electrochromic device 120 can filter colored light such as blue light.

The electrochromic device 120 is in a sheet-like form. The electrochromic device 120 may be disposed on the housing 20 or on the sensor assembly 10, or disposed between the housing 20 and the sensor assembly 10. As an example, the electrochromic device 120 may be pasted on the housing 20 or the sensor assembly 10 through an optical glue. As another example, the electrochromic device 120 may be disposed between the housing 20 and the sensor assembly 10 through a transparent frame, and the electrochromic device 120 is spaced apart from the sensor assembly 10 and the housing 20.

The electrochromic device 120 covering the sensor assembly 10 means that an orthographic projection of the sensor assembly 10 on the electrochromic device 120 is located within the electrochromic device 120. In other words, an orthographic projection of at least one of the light-emitting component 11, the depth camera 12, the environment camera 13, and the proximity sensor is located within the electrochromic device 120.

It can be understood that a plurality of electrochromic devices 120 may be provided, and each electrochromic device 120 corresponds to one of the light-emitting component 11, the depth camera 12, the environment camera 13, and the proximity sensor.

Figure 2:
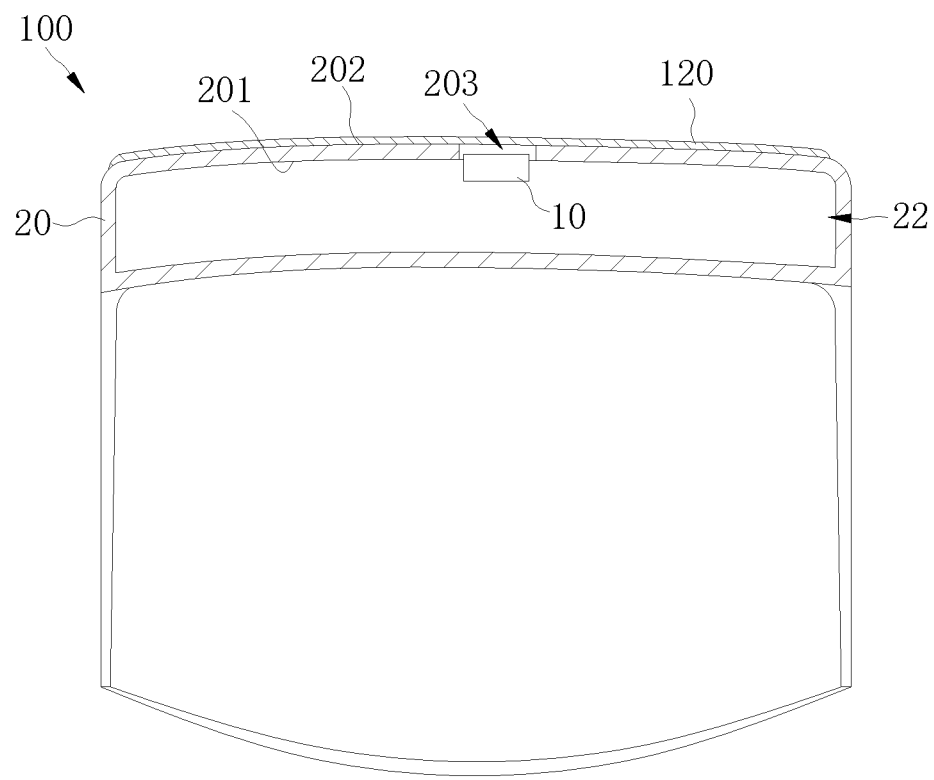
FIG. 2 is a cross-sectional view of a head-mounted device according to an embodiment of the present disclosure.

Referring to FIG. 2, in some embodiments, the housing 20 includes an inner surface 201 and an outer surface 202. An aperture 203 penetrating the inner surface 201 and the outer surface 202 is defined on the housing 20. The sensor assembly 10 is arranged to correspond to the aperture 203 and the electrochromic device 120 is attached to the outer surface 202 of the housing 20. That is, at least one of the light-emitting component 11, the depth camera 12, the environment camera 13, and the proximity sensor is arranged to correspond to the aperture 203.

In this way, the sensor assembly 10 can transmit signals to the outside and/or receive signals from the outside via the aperture 203. The electrochromic device 120 may shield the aperture 203 and cover the sensor assembly 10. It can be understood that, when the sensor assembly 10 transmits a signal to the outside, the signal is transmitted through the aperture 203 and the electrochromic device 120.

The aperture 203 may be a through hole in a round shape, an elliptical shape, or a square shape, etc., and a shape of the aperture 203 is not limited in the present disclosure. One or more apertures 203 may be provided. For example, one apertures 203 is provided when the light-emitting component 11, the depth camera 12, the environment camera 13, and the proximity sensor are arranged close to each other or formed into one piece. When the light-emitting component 11, the depth camera 12, the environment camera 13, and the proximity sensor are spaced apart from each other, a plurality of apertures 203 is provided. The light-emitting component 11, the depth camera 12, the environment camera 13, and the proximity sensor may be arranged to correspond to one same aperture 203.

It should be noted that a receiving chamber 22 is defined by the housing 20, and the inner surface 201 of the housing 20 is a surface defining the receiving chamber. The outer surface 202 of the housing 20 is opposite to the inner surface 201 of the housing 20. The sensor assembly 10 is received in the receiving chamber 22.

Further, the sensor assembly 10 may be at least partially located in the aperture 203. That is, a part of the sensor assembly 10 is located in the aperture 203, or the entire sensor assembly 10 is located in the aperture 203. In this way, the sensor assembly 10 and the housing 20 can form a relatively compact structure, thereby reducing a volume of the head-mounted device 100.

Figure 3:
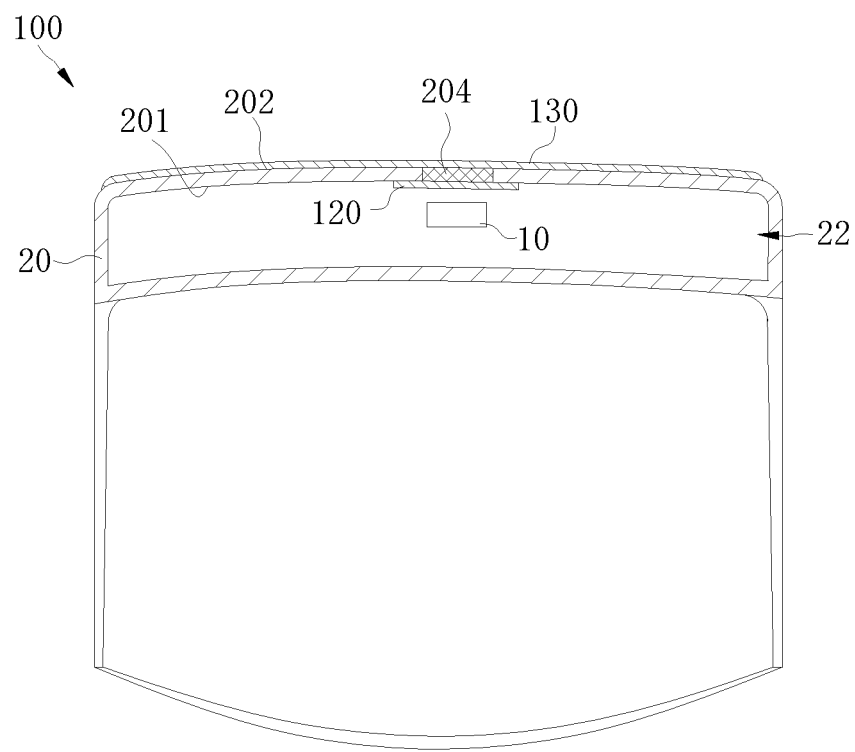
FIG. 3 is a cross-sectional view of a head-mounted device according to an embodiment of the present disclosure.

Referring to FIG. 3, in some embodiments, the housing 20 includes a light-transmitting portion 204 arranged to correspond to the sensor assembly 10, and the electrochromic device 120 is attached to an inner surface 201 of the light-transmitting portion 204. In other words, the housing 20 is at least partially light-transmissive, allowing the sensor assembly 10 to transmit signals to the outside and receive signals from the outside. For example, the light-emitting component 11 can emit light to the outside through the light-transmitting portion 204. The depth camera 12 can obtain depth information of a target object through the light-transmitting portion 204.

The light-transmitting portion 204 may be made of a light-transmitting material, e.g., an acrylic material. A cross section of the light-transmitting portion 204 may be a square shape, a round shape, or in an irregular shape, etc. It should be noted that visible or invisible light can be transmitted through the light-transmitting portion 204. Parts of the housing 20 other than the light-transmitting portion 204 may be light-transmissive or non-light-transmissive.

Figure 4:
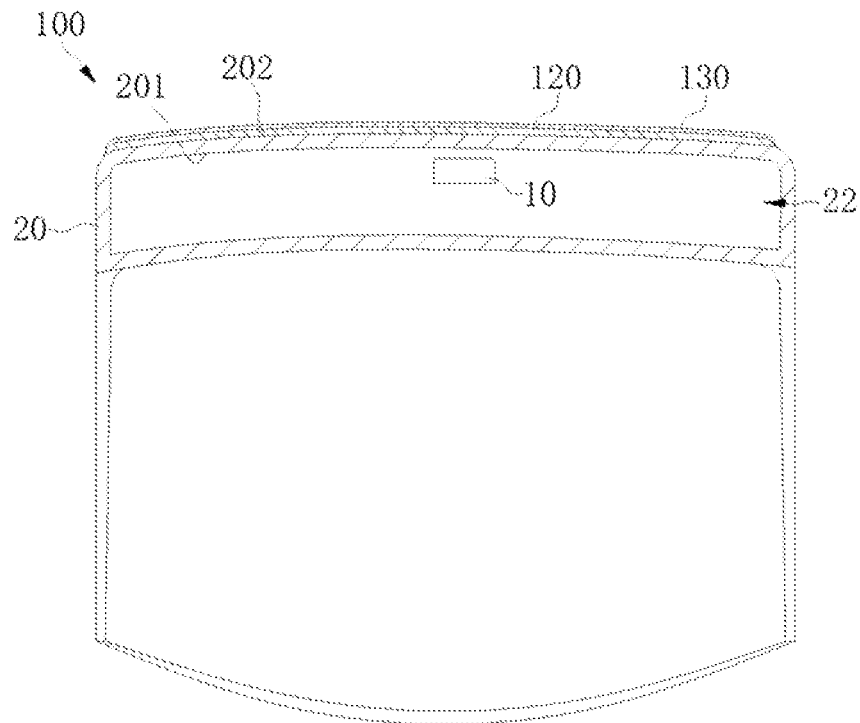
FIG. 4 is a cross-sectional view of a head-mounted device according to an embodiment of the present disclosure.

Referring to FIG. 4, in some embodiments, the housing 20 is a light-transmitting housing, and the electrochromic device 120 is attached to the outer surface 202 and wraps the outer surface 202. In other words, the electrochromic device 202 covers the outer surface 202 of the housing 20. In this way, the electrochromic device 120 can not only cover the sensor assembly 10, but also improve the appearance effect of the head-mounted device 100.

For example, the electrochromic device 120 can be controlled to present different colors as required, so as to change the overall appearance of the head-mounted device 100. It can be understood that, once a voltage of the electrochromic device 120 is changed, the electrochromic device 120 can present different colors. For example, the electrochromic device 120 can present green, red, blue, or a gradient color, such that the head-mounted device 100 as a whole presents green, red, or blue color, or gradient color, etc.

It should be noted that, for ease of understanding, FIG. 4 only illustrates that the electrochromic device 120 is attached to a part of the outer surface 202 of the housing 20.

Further, the head-mounted device 100 includes an antireflection film 130 provided on the electrochromic device 120, and the electrochromic device 120 is sandwiched between the outer surface 202 and the antireflection film 130. In this way, the antireflection film 130 can not only protect the electrochromic device 120, but also improve the overall appearance of the head-mounted device 100. A material of the antireflection film 130 can be calcium fluoride, etc., and the antireflection film 130 is configured to reduce reflection and increase the light transmittance.

Figure 5:
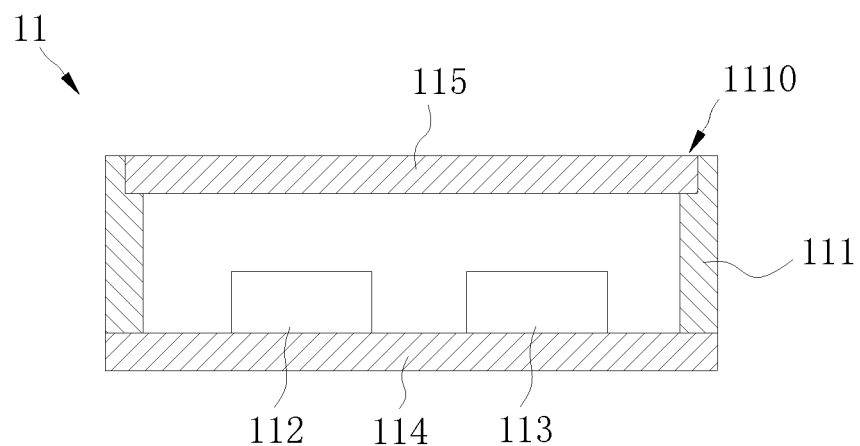
FIG. 5 is a cross-sectional view of a light-emitting component of a head-mounted device according to an embodiment of the present disclosure.

Referring to FIG. 5, in this embodiment, the light-emitting component 11 includes an encapsulation casing 111, a first light-emitting source 112, a second light-emitting source 113, a substrate 114, and a diffuser 115. The first light-emitting source 112 and the second light-emitting source 113 are both arranged on the substrate 114 and located within the encapsulation casing 111. The substrate 114 is fixedly connected to the encapsulation casing 111. For example, the substrate 114 is fixedly connected to the encapsulation casing 111 by means of bonding or welding.

Specifically, the encapsulation casing 111 may be made of a material such as plastic or metal. For example, the material of the encapsulation casing 111 may be stainless steel. A cross section of the encapsulation casing 111 may be in a shape of square, circle, oval, or the like. An opening 1110 is defined at an end of the encapsulation casing 111 facing away from the substrate 114.

The first light-emitting source 112 is configured to emit first light to the outside of the head-mounted device 100. The second light-emitting source 113 is configured to emit second light to the outside of the head-mounted device 100 and supplement light for the environment camera 13. The depth camera 12 is configured to receive the first light reflected by the target object, so as to obtain the depth information of the target object. Further, both the first light and the second light can exit the head-mounted device 100 via the diffuser 115.

In this embodiment, both the first light and the second light are infrared light, and a wavelength of the first light is different from a wavelength of the second light. For example, the wavelength of the first light is 940 nm and the wavelength of the second light is 850 nm. In addition, in other embodiments, the first light and/or the second light may be visible light. It can be understood that when the first light is infrared light, the depth camera 12 is an infrared camera.

Figure 6:
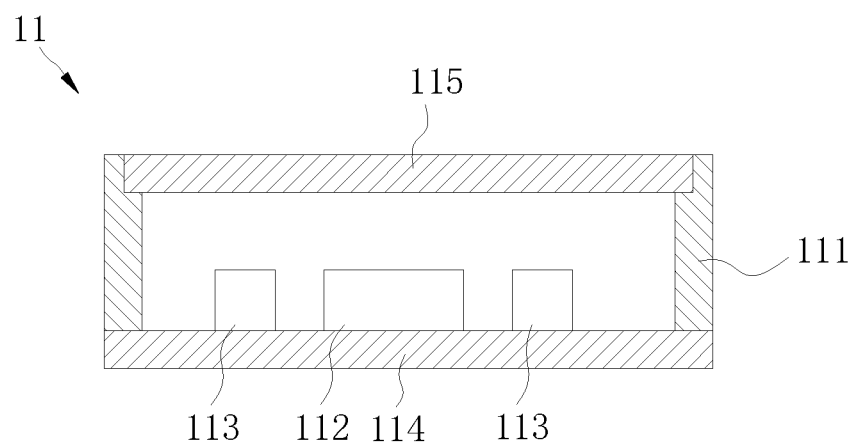
FIG. 6 is a cross-sectional view of a light-emitting component of a head-mounted device according to another embodiment of the present disclosure.

As illustrated in FIG. 6, in some embodiments, a plurality of second light-emitting sources 113 is provided, and the second light-emitting sources 113 are arranged at intervals around the first light-emitting source 112. For example, four second light-emitting sources 113 are provided and arranged at equal angular intervals around the first light-emitting source. The first light-emitting source 112 and/or the second light-emitting source 113 include a vertical cavity surface emitting laser (VCSEL) chip, and the VCSEL chip includes a plurality of VCSEL light sources arranged in an array.

The substrate 114 may be a flexible circuit board, a rigid circuit board, or a combination thereof.

The diffuser 115 is provided at the opening 1110. The diffuser 115 is configured to diffuse the first light and the second light, such that the first light and the second light can be uniformly projected onto the target object.

In the head-mounted device 100 according to the embodiment of the present disclosure, both the first light-emitting source 112 and the second light-emitting source 113 are arranged in the same encapsulation casing 111, such that the structure of the light-emitting component 11 is more compact, thereby reducing the volume of the head-mounted device 100.

Figure 7:
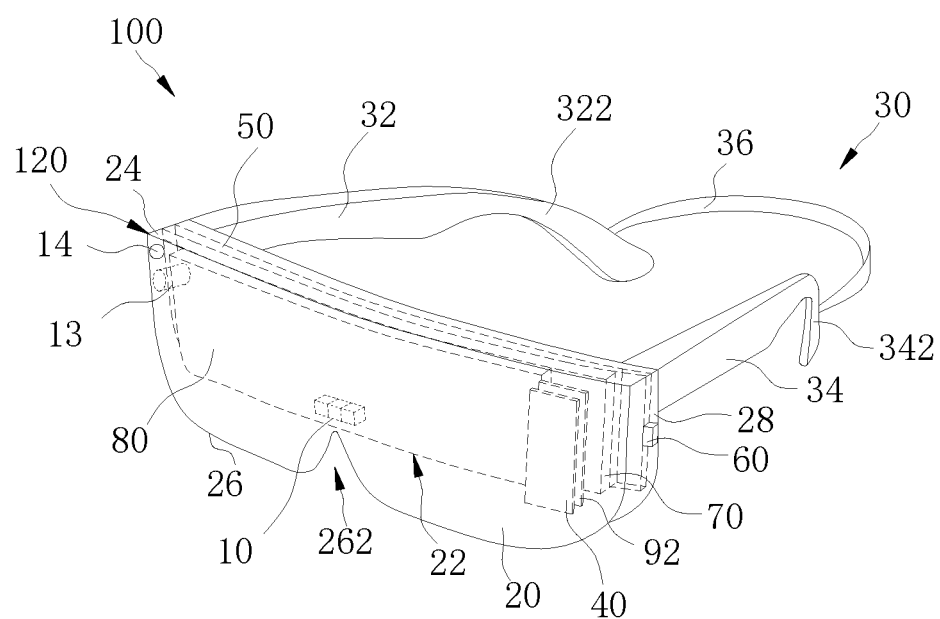
FIG. 7 is a schematic three-dimensional diagram of a head-mounted device according to an embodiment of the present disclosure.
Figure 8:
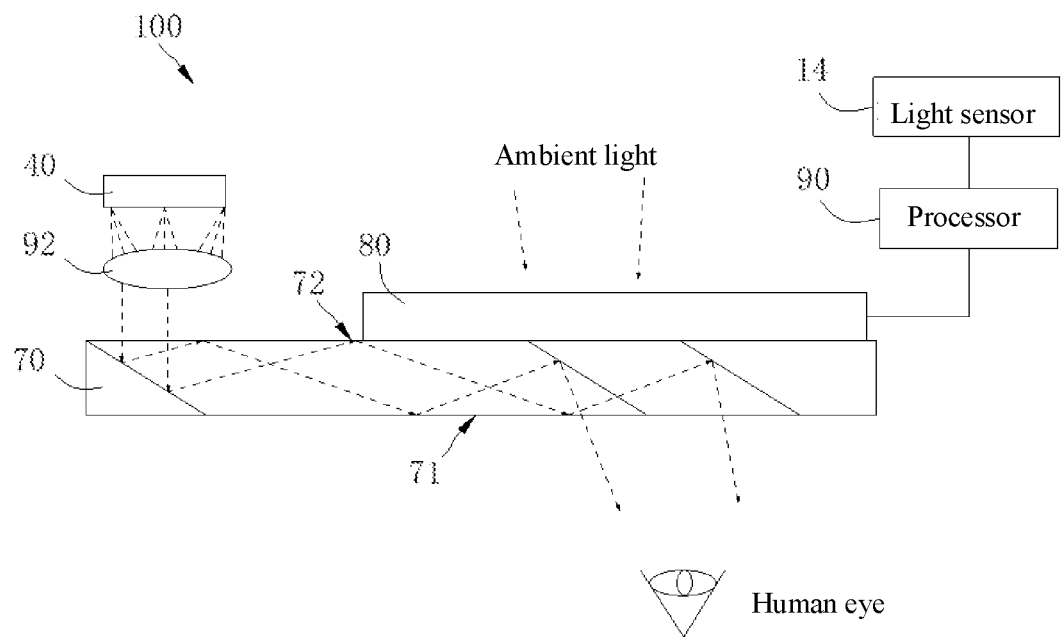
FIG. 8 is a schematic diagram illustrating a structure principle of a head-mounted device according to an embodiment of the present disclosure.

Referring to FIG. 7 and FIG. 8, the head-mounted device 100 according to the embodiment of the present disclosure includes a display 40, a light-guiding component 70, and a light quantity adjustment component 80. The light-emitting component 11, the depth camera 12, and the environment camera 13 are all arranged to avoid the display 40. The light-emitting component 11, the depth camera 12 and the environment camera 13 are all arranged to avoid the light-guiding component 70.

The light-guiding component 70 is provided separately from the display 40. The light-guiding component 70 includes a first side 71, and a second side 72 opposite to the first side 71. The light-guiding component 70 is configured to guide light generated by the display 40, allowing the light to exit the head-mounted device 100 from the first side 71. The light quantity adjustment component 80 is disposed on the second side 72, and the light quantity adjustment component 80 is configured to adjust an amount of ambient light incident on the second side 72.

For a related AR device, the user can see a content displayed by the AR device in a real scene through the AR device. It can be understood that ambient light and light generated by the AR device enter human eyes at the same time. When the ambient light has a relatively higher brightness, a contrast between a display brightness of the AR device and the ambient brightness may be too low, and thus the human eyes can hardly identify the content displayed by the AR device. When the ambient light has a relatively lower brightness, the contrast between the display brightness of the AR device and the ambient brightness may be too high, and thus the content displayed by the VR device may be too dazzling for the human eyes and cause eye fatigue.

Generally, in the related art, in order to solve a problem that the contrast between the display brightness of the AR device and the ambient brightness is too high or too low, the display brightness of the AR device is adjusted. However, with a high ambient brightness, if the display brightness of the AR device is increased to improve clarity of an image observed by the human eyes, power consumption of the AR device may be great, and thus a large amount of heat generated thereby may affect the user experience.

In the head-mounted device 100 according to the embodiments of the present disclosure, the light quantity adjustment component 80 can adjust an amount of ambient light incident from the second side 72 and exiting the head-mounted device 100 from the first side 71, such that the amount of ambient light can less affect the light generated by the display 40 and exiting the head-mounted device 100 from the first side 71, thereby facilitating watching the content displayed on the display 40 by the user and improving the user experience.

It can be understood that when the user wears the head-mounted device 100, the human eyes are located outside the first side 71. Therefore, the light generated by the display 40 can enter the human eyes after exiting the head-mounted device 100 from the first side 71, such that the user can see an image displayed on the display 40.

The ambient light enters the human eyes after sequentially passing through the light quantity adjustment component 80, the second side 72, and the first side 71, such that the user can see ambient objects. Therefore, the light quantity adjustment component 80 provided by the present disclosure can adjust the ambient light entering the human eyes, thereby mitigating the influence of the ambient light exerted on the image seen by the human eyes.

Figure 9:
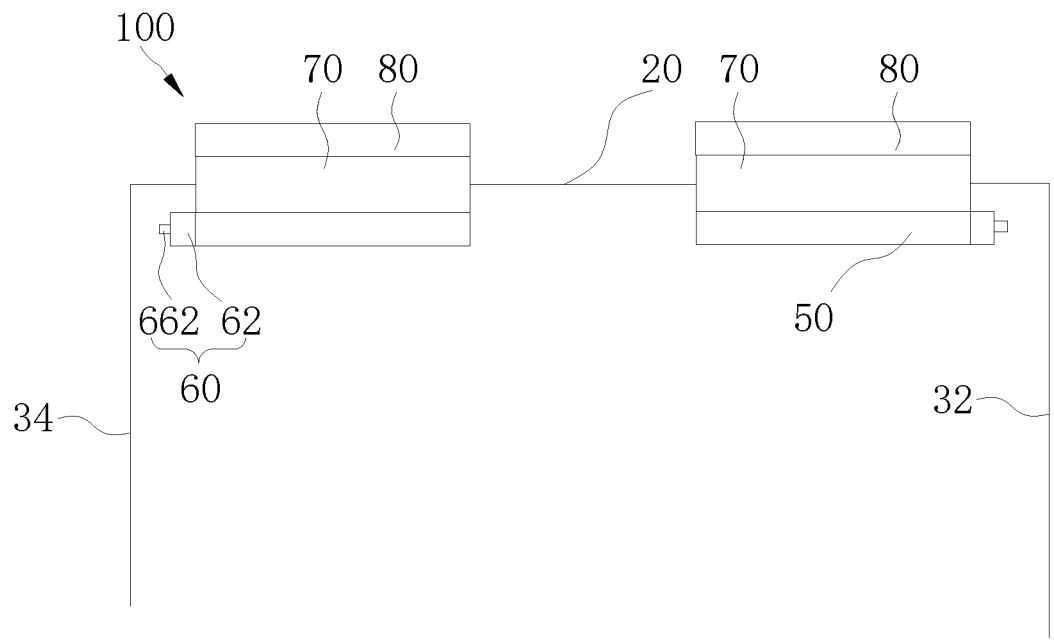
FIG. 9 is a plan view of a head-mounted device according to another embodiment of the present disclosure.

Referring to FIG. 7 to FIG. 9, the head-mounted device 100 according to the embodiment of the present disclosure further includes a support component 30, a refractive component 50, an adjustment mechanism 60, a processor 90, a light sensor 14, and a collimating component 92.

The housing 20 is an external component of the head-mounted device 100 and plays a role of protecting and fixing internal components of the head-mounted device 100. The internal components can be enclosed by the housing 20 and protected from being directly damaged by external factors.

Specifically, in this embodiment, the housing 20 can be configured to fix at least one of the display 40, the refractive component 50, the adjustment mechanism 60, the light-guiding component 70, and the light quantity adjustment component 80. In an example illustrated in FIG. 7, the receiving chamber 22 is defined by the housing 20, and the display 40 and the refractive component 50 are received in the receiving chamber 22. The adjustment mechanism 60 partially protrudes from the housing 20.

The housing 20 further includes a top housing wall 24, a bottom housing wall 26 and a side housing wall 28. A notch 262 recessing towards the top housing wall 24 is defined in the middle of the bottom housing wall 26. That is, the housing 20 is roughly in a B-like shape. When the user wears the head-mounted device 100, the head-mounted device 100 can be supported on the user's bridge of nose through the notch 262, thereby guaranteeing the stability of the head-mounted device 100 and wear comfort of the user. The adjustment mechanism 60 may partially protrude from the side housing wall 28, allowing the user to adjust the refractive component 50.

In addition, the housing 20 may be manufactured by machining an aluminum alloy with a computerized numerical control (CNC) machine tool, or may be injection molded using polycarbonate (PC) or using PC and acrylonitrile butadiene styrene plastic (ABS). The specific manufacturing method and material of the housing 20 are not limited in the present disclosure.

The support component 30 is configured to support the head-mounted device 100. When the user wears the head-mounted device 100, the head-mounted device 100 may be fixed on the head of the user through the support component 30. In the example illustrated in FIG. 7, the support component 30 includes a first bracket 32, a second bracket 34, and an elastic band 36.

The first bracket 32 and the second bracket 34 are symmetrically arranged with respect to the notch 262. Specifically, the first bracket 32 and the second bracket 34 are rotatably arranged on side edges of the housing 20. When the user does not need to use the head-mounted device 100, the first bracket 32 and the second bracket 34 can be stacked to be close to the housing 20 for storage. When the user needs to use the head-mounted device 100, the first bracket 32 and the second bracket 34 can be unfolded to exert the support function thereof.

A first bending portion 322 is formed at an end of the first bracket 32 facing away from the housing 20, and the first bending portion 322 is bent towards the bottom housing wall 26. In this way, when the user wears the head-mounted device 100, the first bending portion 322 can be supported on the user's ear to prevent the head-mounted device 100 from slipping off.

Similarly, a second bent portion 342 is formed at an end of the second bracket 34 facing away from the housing 20. The explanation and description of the second bending portion 342 can be referred to that of the first bending portion 322, which is not described in detail for brevity.

The elastic band 36 is detachably connected to the first bracket 32 and the second bracket 34. In this way, when the user wears the head-mounted device 100 and performs vigorous movements, the head-mounted device 100 can be fixed through the elastic band 36 to prevent the head-mounted device 100 from loosening or even falling during the vigorous movements. It can be understood that, in other examples, the elastic band 36 may be omitted.

In this embodiment, the display 40 includes an organic light-emitting diode (OLED) display screen. The OLED display screen does not require a backlight, which is beneficial to a light and thin design of the head-mounted device 100. In addition, an OLED screen has a large viewing angle but consumes low power, which is conducive to saving power consumption.

Of course, the display 40 can also be a light-emitting diode (LED) display or a micro LED display. These displays are merely examples and the embodiments of the present disclosure are not limited to any of these examples.

Figure 10:
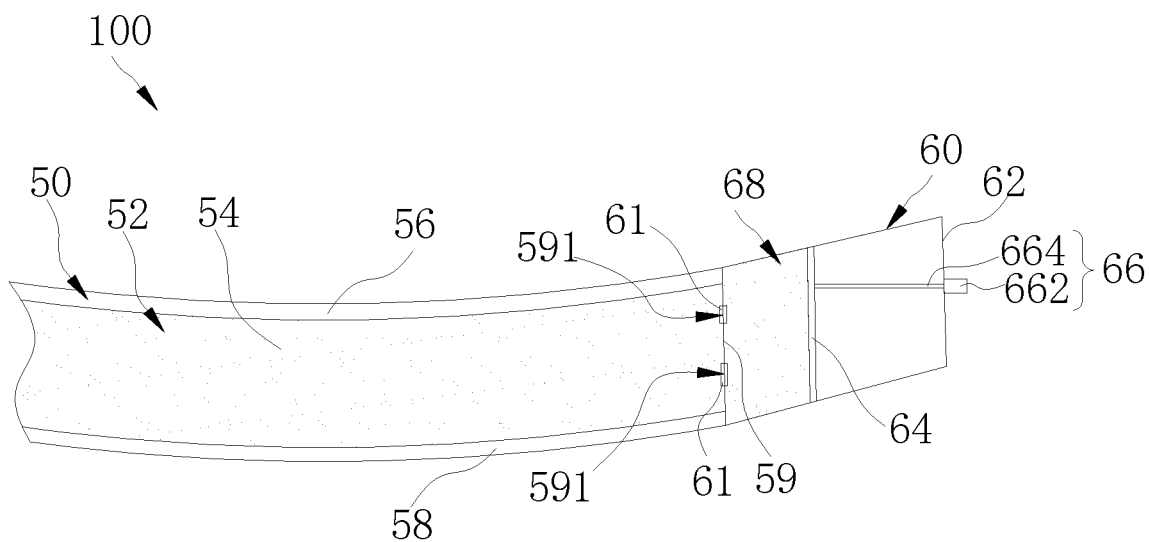
FIG. 10 is a plan view of a partial structure of a head-mounted device according to an embodiment of the present disclosure.

Referring to FIG. 10, the refractive component 50 is arranged on a side of the display 40. In this embodiment, the refractive component is located on the first side 71 of the light-guiding component 70.

The refractive component 50 includes a refractive chamber 52, a light-transmitting liquid 54, a first film layer 56, a second film layer 58, and a side wall 59.

The light-transmitting liquid 54 is filled in the refractive chamber 52. The adjustment mechanism 60 is configured to adjust an amount of the light-transmitting liquid 54 for adjusting a form of the refractive component 50. Specifically, the second film layer 58 is opposite to the first film layer 56, the side wall 59 connects the first film layer 56 with the second film layer 58. The refractive chamber 52 is defined by the first film layer 56, the second film layer 58, and the side wall 59. The adjustment mechanism 60 is configured to adjust the amount of the light-transmitting liquid 54 for changing a shape of the first film layer 56 and/or the second film layer 58.

In this way, a refractive function of the refractive component 50 is realized. Specifically, "changing the shape of the first film layer 56 and/or the second film layer 58" includes three cases. In a first case, the shape of the first film layer 56 is changed, but the shape of the second film layer 58 is not changed; in a second case, the shape of the second film layer 58 is changed, but the shape of the first film layer 56 is not changed; and in a third case, both the shape of the first film layer 56 and the shape of the second film layer 58 are changed. It should be noted that, for the convenience of explanation, in this embodiment, the first case is taken as an example for description.

The first film layer 56 may have elasticity. It can be understood that, since a pressure in the refractive chamber 52 changes with a change in the amount of the light-transmitting liquid 54 in the refractive chamber 52, the form of the refractive component 50 changes accordingly.

In an example, when the adjustment mechanism 60 reduces the amount of the light-transmitting liquid 54 in the refractive chamber 52, the pressure in the refractive chamber 52 is reduced, and a difference between a pressure outside the refractive chamber 52 and a pressure inside the refractive chamber 52 is increased, and thus the refractive chamber 52 becomes more concave in shape.

In another example, when the adjustment mechanism 60 increases the amount of the light-transmitting liquid 54 in the refractive chamber 52, the pressure in the refractive chamber 52 is increased, and the difference between the pressure outside the refractive chamber 52 and the pressure inside the refractive chamber 52 is reduced, and thus the refractive chamber 52 becomes more convex in shape.

In this way, the form of the refractive component 50 can be adjusted by adjusting the amount of the light-transmitting liquid 54.

The adjustment mechanism 60 is connected to the refractive component 50. The adjustment mechanism 60 is configured to adjust the form of the refractive component 50 to adjust a refractive degree of the refractive component 50. Specifically, the adjustment mechanism 60 includes a chamber body 62, a sliding member 64, a driving component 66, an adjustment chamber 68, and a switch 61.

The sliding member 64 is slidably arranged in the chamber body 62. The driving component 66 is connected to the sliding member 64. The adjustment chamber 68 is defined by both the chamber body 62 and the sliding member 64. The adjustment chamber 68 is in communication with the refractive chamber 52 through the side wall 59. The driving component 66 is configured to drive the sliding member 64 to slide relative to the chamber body 62 for adjusting a volume of the adjustment chamber 68, thereby adjusting the amount of the light-transmitting liquid 54 in the refractive chamber 52.

In this way, the amount of the light-transmitting liquid 54 in the refractive chamber 52 is adjusted through adjusting the volume of the adjustment chamber 68 by means of the sliding member 64. In an example, referring to FIG. 11, the sliding member 64 slides away from the side wall 59. In this case, the volume of the adjustment chamber 68 increases, a pressure in the adjustment chamber 68 decreases, and the light-transmitting liquid 54 in the refractive chamber 52 enters the adjustment chamber 68, such that the first film layer 56 is gradually recessed inwardly.

Figure 12:
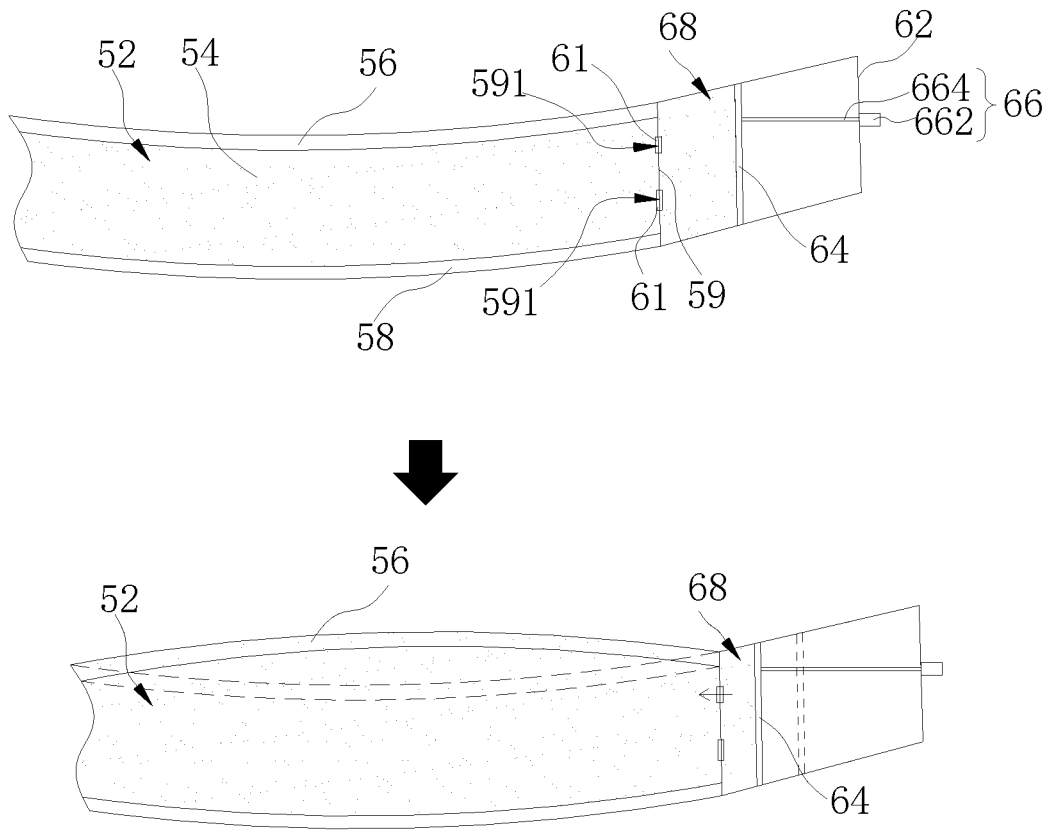
FIG. 12 is another schematic diagram illustrating an adjustment process of a head-mounted device according to an embodiment of the present disclosure.

In another example, referring to FIG. 12, the sliding member 64 slides towards the side wall 59. In this case, the volume of the adjustment chamber 68 decreases, the pressure in the adjustment chamber 68 increases, and the light-transmitting liquid 54 in the adjustment chamber 68 enters the refractive chamber 52. Therefore, the first film layer 56 gradually protrudes outwardly.

A flow channel 5 is defined on the side wall 59 and is in communication with the adjustment chamber 68 and the refractive chamber 52. The adjustment mechanism 60 includes the switch 61 provided in the flow channel 5, and the switch 61 is configured to control open and close states of the flow channel 5.

In this embodiment, two switches 61 are provided. Both switches 61 are one-way switches. One switch 61 is configured to control the light-transmitting liquid 54 to flow from the adjustment chamber 68 to the refractive chamber 52, and the other switch 61 is configured to control the light-transmitting liquid 54 to flow from the refractive chamber 52 to the adjustment chamber 68.

In this way, the flow of the light-transmitting liquid 54 between the adjustment chamber 68 and the refractive chamber 52 is realized through the switches 61 so as to maintain a pressure balance on both sides of the side wall 59. As described above, the change in the volume of the adjustment chamber 68 may cause the pressure in the adjustment chamber 68 to change, thereby realizing the flow of the light-transmitting liquid 54 between the adjustment chamber 68 and the refractive chamber 52. The switches 61 control the open and close states of the flow channel 5, so as to control the flow of the light-transmitting liquid 54 between the adjustment chamber 68 and the refractive chamber 52, thereby controlling an adjustment of the form of the refractive component 50.

Figure 11:
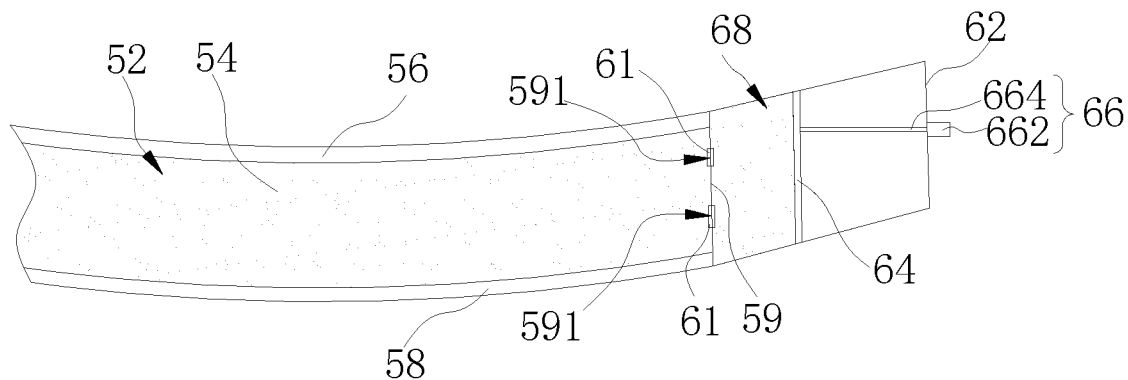
FIG. 11 is a schematic diagram illustrating an adjustment process of a head-mounted device according to an embodiment of the present disclosure.
Figure 11:
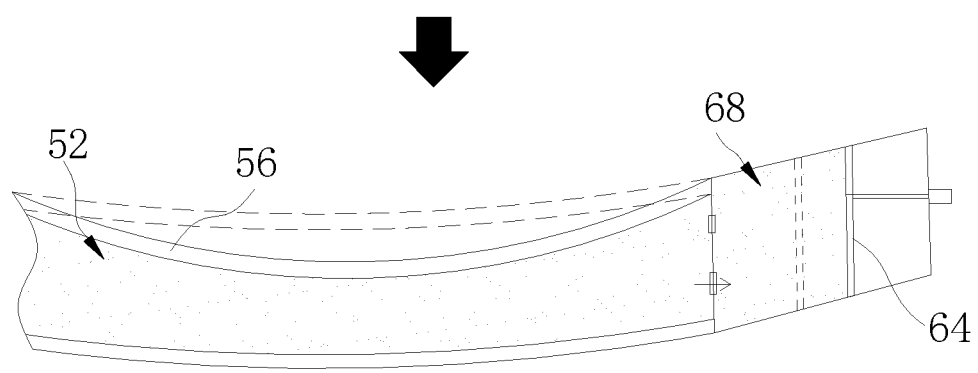

In an example, referring to FIG. 11, opened is the switch 61 that controls the light-transmitting liquid 54 to flow from the refractive chamber 52 to the adjustment chamber 68. In this case, the sliding member 64 slides away from the side wall 59 to increase the volume of the adjustment chamber 68, and thus the pressure in the adjustment chamber 68 decreases. Consequently, the light-transmitting liquid 54 in the refractive chamber 52 enters the adjustment chamber 68 through the switch 61, and the first film layer 56 is gradually recessed inwardly.

In another example, closed is the switch 61 that controls the light-transmitting liquid 54 to flow from the refractive chamber 52 to the adjustment chamber 68. In this case, even the sliding member 64 slides away from the side wall 59 to increase the volume of the adjustment chamber 68 and to reduce the pressure in the adjustment chamber 68, the light-transmitting liquid 54 in the refractive chamber 52 cannot enter the adjustment chamber 68, and thus the form of the first film layer 56 does not change.

In another example, referring to FIG. 12, opened is the switch 61 that controls the light-transmitting liquid 54 to flow from the adjustment chamber 68 to the refractive chamber 52. In this case, the sliding member 64 slides towards the side wall 59 to reduce the volume of the adjustment chamber 68, and thus the pressure in the adjustment chamber 68 increases. Consequently, the light-transmitting liquid 54 in the adjustment chamber 68 enters the refractive chamber 52 through the switch 61, and the first film layer 56 gradually protrudes outwardly.

In another example, closed is the switch 61 that controls the light-transmitting liquid 54 to flow from the adjustment chamber 68 to the refractive chamber 52. In this case, even the sliding member 64 slides towards the side wall 59 to reduce the volume of the adjustment chamber 68 and to increase the pressure in the adjustment chamber 68, the light-transmitting liquid 54 in the adjustment chamber 68 cannot enter the refractive chamber 52, and thus the form of the first film layer 56 does not change.

The driving component 66 can drive the sliding member 64 to slide, depending upon various structures and principles.

In the examples illustrated in FIG. 8 to FIG. 12, the driving component 66 includes a knob 662 and a screw 664. The screw 664 is connected to the knob 662 and the sliding member 64. The knob 662 is configured to drive the screw 664 to rotate, so as to drive the sliding member 64 to slide relative to the chamber body 62.

In this way, the sliding member 64 can be driven by the knob 662 and the screw 664. With the cooperation between the screw 664 and the knob 662, a rotational motion of the knob 662 can be converted into a linear motion of the screw 664. Consequently, when the user rotates the knob 662, the screw 664 can drive the sliding member 64 to slide relative to the chamber body 62, so as to change the volume of the adjustment chamber 68, thereby adjusting the amount of the light-transmitting liquid 54 in the refractive chamber 52. The knob 662 can protrude from the housing 20 for the user to perform rotation.

Specifically, the knob 662 is formed with a threaded portion, the screw 664 is formed with a threaded portion that matches the threaded portion of the knob 662, and the knob 662 and the screw 664 are connected to each other through threads.

While the knob 662 is rotating, the switch 61 can be opened correspondingly. In this way, the light-transmitting liquid 54 can flow to reach the pressure balance on both sides of the side wall 59.

In an example, the knob 662 rotates clockwise and the sliding member 64 slides away from the side wall 59 to open the switch 61 that controls the light-transmitting liquid 54 to flow from the refractive chamber 52 to the adjustment chamber 68. In another example, the knob 662 rotates counterclockwise and the sliding member 64 slides towards the side wall 59 to open the switch 61 that controls the light-transmitting liquid 54 to flow from the adjustment chamber 68 to the refractive chamber 52.

It should be noted that in this embodiment, a rotation angle of the knob 662 is not correlated to the refractive degree of the refractive component 50, and the user can rotate the knob 662 to any position to have the optimal visual experience. Of course, in other embodiments, the rotation angle of the knob 662 may be correlated to the refractive degree of the refractive component 50. In the present disclosure, it is not specifically limited whether the rotation angle of the gear 666 and the refractive degree of the refractive component 50 are correlated to each other.

Figure 13:
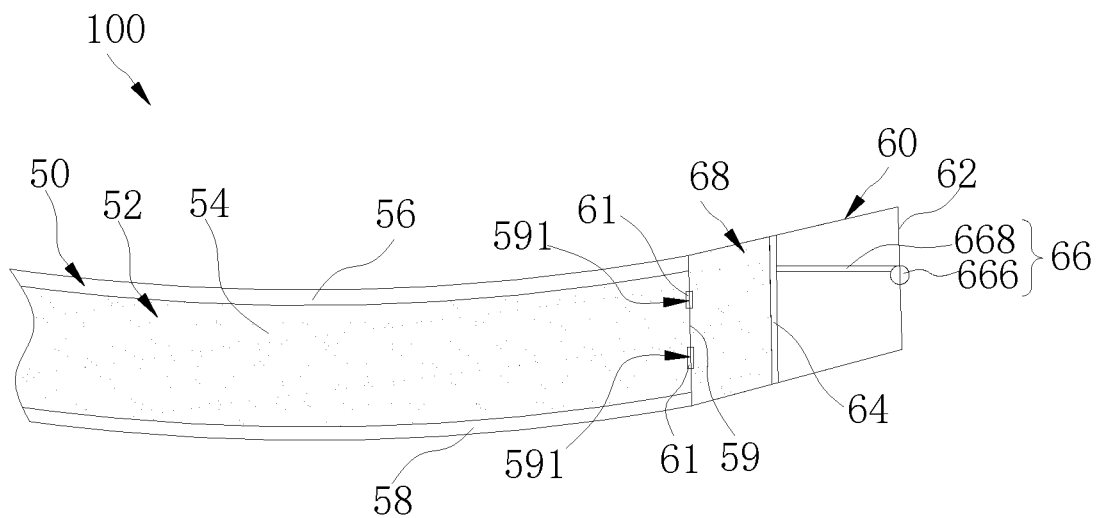
FIG. 13 is a plan view of a partial structure of a head-mounted device according to another embodiment of the present disclosure.

Referring to FIG. 13, the driving component 66 includes a gear 666 and a rack 668 engaging with the gear 666. The rack 668 connects the gear 666 and the sliding member 64. The gear 666 is configured to drive the rack 668 to move, so as to drive the sliding member 64 to slide relative to the chamber body 62.

In this way, the sliding member 64 can be driven by the gear 666 and the rack 668. With the cooperation between the gear 666 and the rack 668, a rotational motion of the gear 666 can be converted into a linear motion of the rack 668. Consequently, when the user rotates the gear 666, the rack 668 can drive the sliding member 64 to slide relative to the chamber body 62, so as to change the volume of the adjustment chamber 68, thereby adjusting the amount of the light-transmitting liquid 54 in the refractive chamber 52. The gear 666 may protrude from the housing 20 for the user to perform rotation.

Similarly, while the gear 666 is rotating, the switch 61 can be opened correspondingly. In this way, the light-transmitting liquid 54 can flow to reach the pressure balance on both sides of the side wall 59.

In an example, when the gear 666 rotates clockwise to enable the rack 668 to engage with the gear 666, a length of the rack 668 is reduced, and thus the sliding member 64 is pulled to move away from the side wall 59, thereby opening the switch 61 that controls the light-transmitting liquid 54 to flow from the adjustment chamber 68 to the refractive chamber 52.

In another example, when the gear 666 rotates counterclockwise to enable the rack 668 engaged with the gear 666 to disengage from the gear 666, the length of the rack 668 is increased, and thus the sliding member 64 is pushed to move towards the side wall 59, thereby opening the switch 61 that controls the light-transmitting liquid 54 to flow from the adjustment chamber 68 to the refractive chamber 52.

Similarly, in this embodiment, the rotation angle of the gear 666 is not correlated to the refractive degree of the refractive component 50, and the user can rotate the gear 666 to any position to have the optimal visual experience. Of course, in other embodiments, the rotation angle of the gear 666 may be correlated to the refractive degree of the refractive component 50. In the present disclosure, it is not specifically limited whether the rotation angle of the gear 666 and the refractive degree of the refractive component 50 are correlated to each other.

It should be noted that the refractive component 50 is not merely limited to the above-mentioned structure including the refractive chamber 52, the light-transmitting liquid 54, the first film layer 56, the second film layer 58, and the side wall 59, and any structure is possible as long as the refractive degree of the refractive component 50 can be changed. For example, in other implementations, the refractive component 50 may include a plurality of lenses, and a driving member configured to drive each lens to move from a storage position to a refractive position. In this way, the refractive degree of the refractive component 50 can be changed by a combination of the plurality of lenses. Of course, the driving member may also drive each lens at the refractive position to move along a refractive axis, thereby changing the refractive degree of the refractive component 50.

Therefore, the form of the above refractive component includes a shape and a state of the refractive component. The above-mentioned structure of the refractive chamber 52, the light-transmitting liquid 54, the first film layer 56, the second film layer 58, and the sidewall 59 changes the refractive degree by changing a shape of the first film layer 56 and/or the second film layer 58; and the above-mentioned structure of the plurality of lenses and the driving member changes the refractive degree by changing a state of the plurality of lenses.

Referring to FIG. 8 and FIG. 9, the light-guiding component 70 is located between the refractive component 50 and the light quantity adjustment component 80. The light-guiding component 70 may be a plate-shaped light guide element, and the light-guiding component 70 may be made of a light-transmitting material such as resin. As illustrated in FIG. 8, after the light generated by the display 40 enters the light-guiding component 70, the light in different propagation directions propagates in the light-guiding component 70 by total reflection and exit the light-guiding component 70 from the first side 71 of the light-guiding component 70, thereby allowing the human eyes to see the content displayed on the display 40.

The light quantity adjustment component 80 may be fixed to the light-guiding component 70 through an optical glue. The light quantity adjustment component 80 includes an electrochromic element, and a light transmittance of the electrochromic element is changed after a voltage is applied to the electrochromic element. In this way, an amount of light passing through the electrochromic element can be adjusted by changing the light transmittance of the electrochromic element, thereby adjusting an amount of ambient light passing through the second side 72 and the first side 71.

It can be understood that a stable and reversible color change the electrochromic element occurs under an action of an external electric field, exhibiting a reversible appearance change in color and transparency. In this way, the electrochromic element can realize the change of the light transmittance.

Figure 14:
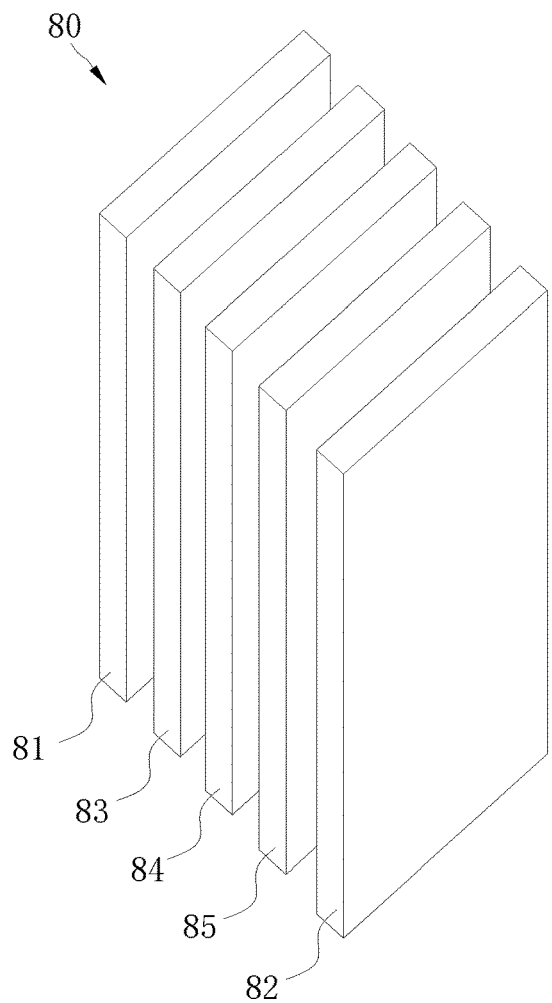
FIG. 14 is a plan view of a light quantity adjustment component according to an embodiment of the present disclosure.

Specifically, referring to FIG. 14, the electrochromic element may include a first conductive layer 81, a second conductive layer 82, an electrochromic layer 83, an electrolyte layer 84, and an ion storage layer 85 that are arranged in a stacked manner. The electrochromic layer 83 is disposed between the first conductive layer 81 and the second conductive layer 82. The first conductive layer 81 and the second conductive layer 82 are configured to cooperatively apply a voltage to the electrochromic layer 83. The electrolyte layer 84 and the ion storage layer 85 are stacked in sequence between the electrochromic layer 83 and the second conductive layer 82. In this way, the first conductive layer 81 and the second conductive layer 82 can provide an electrochromic voltage to allow a change of light transmittance of the electrochromic, thereby changing the light transmittance of the electrochromic element, and the electrolyte layer and the ion storage layer 85 can ensure that the electrochromic layer 83 can change the light transmittance normally.

It should be noted that the above-mentioned structure of the electrochromic device 120 is similar to a structure of the electrochromic element. Therefore, the structure of the electrochromic device 120 provided by the present disclosure can be referred to the structure of the electrochromic element, which is not described in detail herein.

In the embodiment of the present disclosure, the processor 90 is connected to the light quantity adjustment component 80. The processor 90 is configured to control the light transmittance of the light quantity adjustment component 80, so as to allow the light quantity adjustment component 80 to adjust the amount of ambient light incident on the second side 72. In this way, the processor 90 can accurately adjust the light transmittance of the light quantity adjustment component 80.

As described above, when the light quantity adjustment component 80 is an electrochromic element, the processor 90 can control the voltage applied to the electrochromic element for controlling the light transmittance of the electrochromic element. In other words, the light transmittance of the light quantity adjustment component 80 is controlled by adjusting the voltage applied to the electrochromic element. The processor 90 may include a circuit board, a processing chip disposed on the circuit board, and other elements and components.

The light sensor 14 is connected to the processor 90. The light sensor 14 is configured to detect the ambient brightness, and the processor 90 is configured to adjust the light transmittance of the light quantity adjustment component 80 based on the ambient brightness. In this case, the ambient brightness and the light transmittance of the light quantity adjustment component 80 have an inverse correlation relationship.

The light transmittance of the light quantity adjustment component 80 can be automatically adjusted in such a manner that the user can clearly see the content displayed on the display 40, and eye fatigue of the user is less likely to occur.

Figure 15:
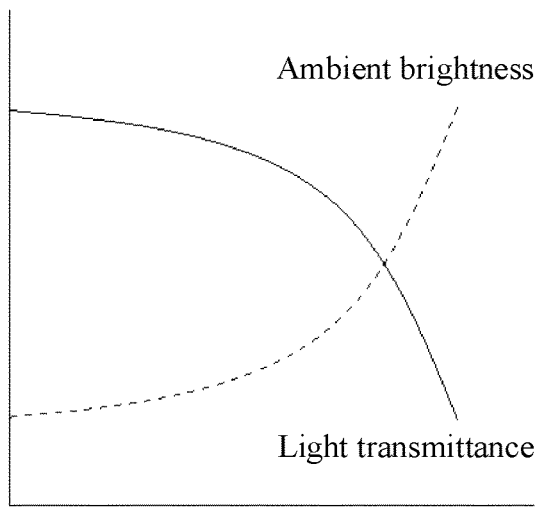
FIG. 15 is a graph illustrating a relationship between ambient brightness and a light transmittance of a light quantity adjustment component according to an embodiment of the present disclosure.

As illustrated in FIG. 15, when the ambient brightness increases, the light transmittance of the light quantity adjustment component 80 decreases; and when the ambient brightness decreases, the light transmittance of the light quantity adjustment component 80 increases. In this way, a contrast of the display screen of the display 40 is in a comfortable viewing range for human eyes, thereby improving the user experience.

The collimating component 92 is disposed between the display 40 and the light-guiding component 70. The collimating component 92 is configured to collimate the light generated by the display 40 before the light is transmitted to the light-guiding component 70. In this way, the collimating component 92 can convert the light generated by the display 40 into parallel light before the light enters the light guiding component 70, thereby reducing light loss.

The collimating component 92 may include a plurality of lenses, which may be superimposed onto each other to collimate light. The light generated by the display 40 enters the light-guiding component 70 after passing through the collimating component 92, and the light is reflected totally or diffracted in the light-guiding component 70 and then exits the first side 71 of the light-guiding component 70.

In some embodiments, when a current ambient brightness is lower than a predetermined brightness, the processor 90 is configured to: turn on the first light-emitting source 112, the depth camera 12, and the environment camera 13, allowing the depth camera 12 to obtain the depth information of the target object; and turn on the second light-emitting source 113 to supplement light for the environment camera 13, allowing the environment camera 13 to obtain the spatial environment information.

In the head-mounted device 100 according to the embodiment of the present disclosure, the second light-emitting source 113 can be turned on to supplement light for the environment camera 13 when the current ambient brightness is lower than the predetermined brightness. In this way, the environment camera 13 can capture images with a satisfying quality, such that the head-mounted device 100 can still obtain environment information in dark environment.

It can be understood that the second light emitted by the second light-emitting source 113 can be transmitted to the target object to increase a light intensity in the environment when the ambient light is relatively weak.

Figure 16:
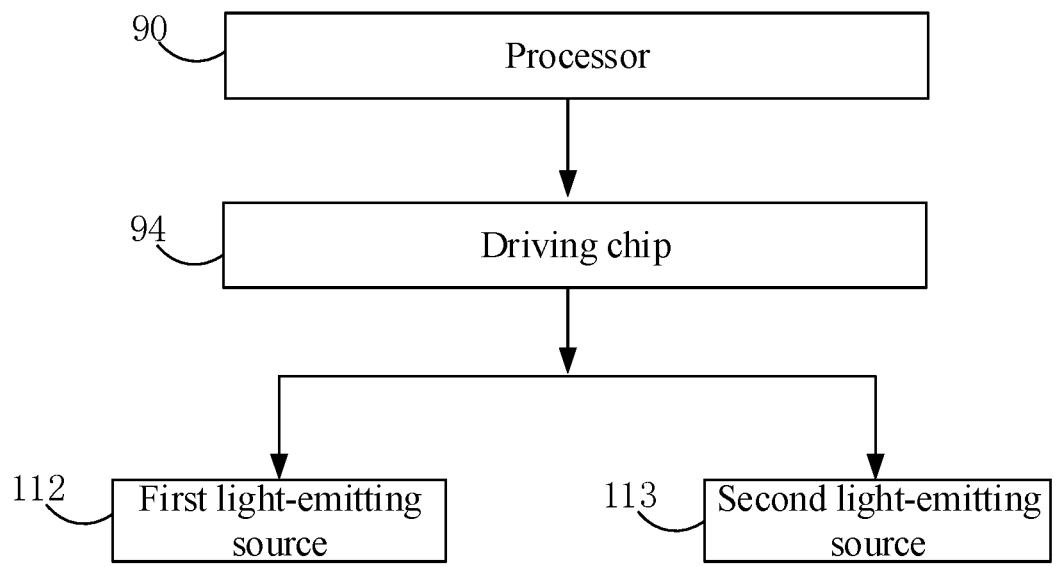
FIG. 16 is a block diagram illustrating modules of a head-mounted device according to an embodiment of the present disclosure.

Referring to FIG. 16, in some embodiments, the head-mounted device 100 includes one driving chip 94. The driving chip 94 is connected to the processor 90, the first light-emitting source 112, and the second light-emitting source 113. When the current ambient brightness is lower than the predetermined brightness, the processor 90 is configured to control the driving chip 94 to output a first driving signal and a second driving signal. The first driving signal is configured to drive the first light-emitting source 112, and the second driving signal is configured to drive the second light-emitting source 113. In this way, one driving chip 94 can drive two light-emitting sources to reduce a hardware quantity of the head-mounted device 100, thereby reducing the cost of the head-mounted device 100.

Figure 17:
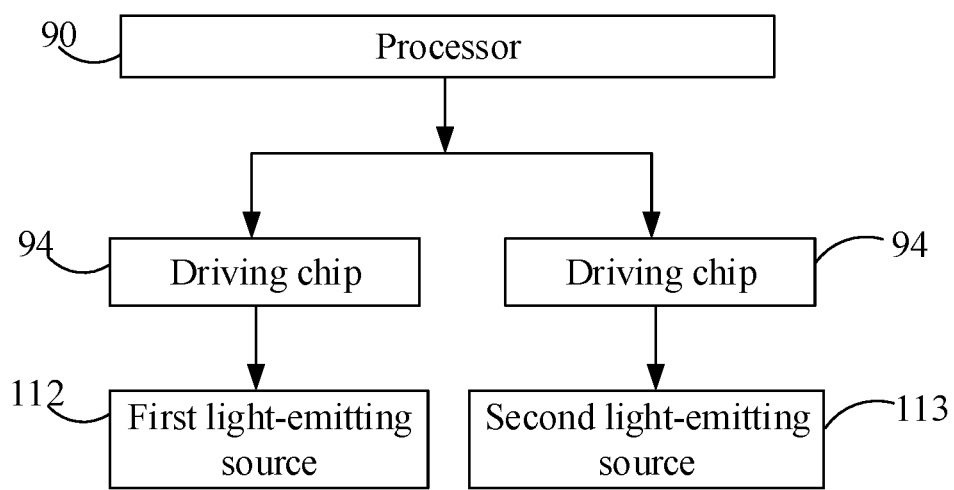
FIG. 17 is a block diagram illustrating modules of a head-mounted device according to another embodiment of the present disclosure.

Referring to FIG. 17, in some embodiments, the head-mounted device 100 includes two driving chips 94, which are both connected to the processor 90. One driving chip 94 is connected to the first light-emitting source 112, and the other driving chip 94 is connected to the second light-emitting source 113. When the current ambient brightness is lower than the predetermined brightness, The processor 90 is configured to control one of the driving chips 94 to output the first driving signal and control the other driving chip 94 to output the second driving signal. The first driving signal is configured to drive the first light-emitting source 112, and the second driving signal is configured to drive the second light-emitting source 113. In this way, these two driving chips 94 control the corresponding light-emitting sources, respectively, allowing a working state of each light-emitting source to be controlled in an easier manner.

In some embodiments, the processor 90 is configured to obtain the current ambient brightness through the light sensor 14. In other words, the light sensor 14 may detect the current ambient brightness and transmit the detected current ambient brightness to the processor 90. In this way, it is convenient and effective to obtain the current ambient brightness.

In some embodiments, the processor 90 is configured to obtain a spatial environment image captured by the environment camera 13, and calculate a gray level of the spatial environment image; and obtain the current ambient brightness based on the gray level. In this embodiment, the light sensor 14 can be omitted to reduce the cost of the head-mounted device 100.

Figure 18:
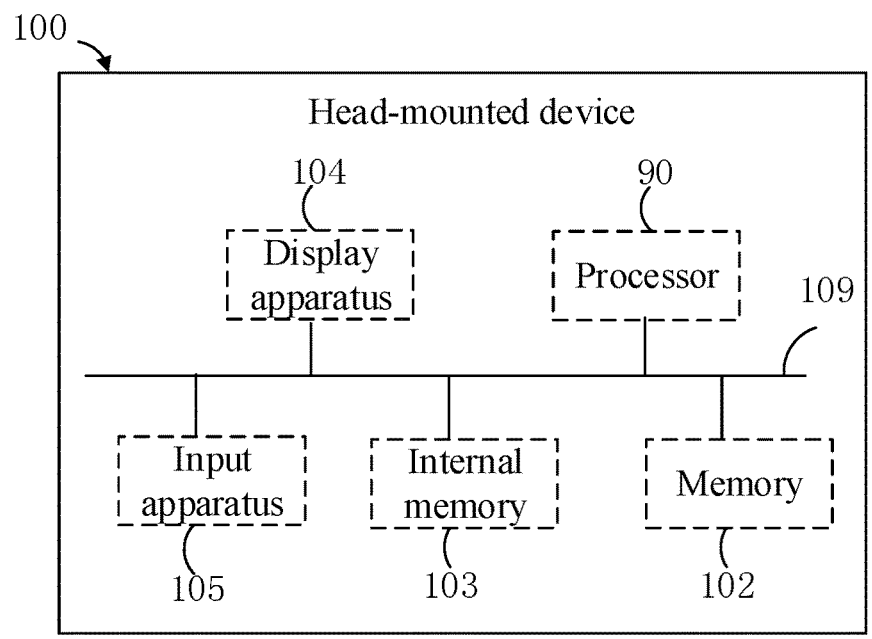
FIG. 18 is a block diagram illustrating internal modules of a head-mounted device according to an embodiment of the present disclosure.

FIG. 18 is a schematic block diagram illustrating modules in the head-mounted device 100 according to an embodiment. The head-mounted device 100 includes the processor 90, a memory 102 (for example, a non-volatile storage medium), an internal storage 103, a display apparatus 104, and an input apparatus 105, which are connected through a system bus 109.

The processor 90 can be configured to provide computing and control capabilities for supporting the operation of the entire head-mounted device 100. The internal storage 103 of the head-mounted device 100 provides an execution environment for computer-readable instructions in the memory 102. The display apparatus 104 of the head-mounted device 100 can be the display 40 provided on the head-mounted device 100. The input apparatus 105 can be an acoustic and electrical element and a vibration sensor that are provided on the head-mounted device 100; or input apparatus 105 can be a button, a trackball, a touchpad, and the like that are provided on the head-mounted device 100; or input apparatus 105 can be a keyboard, a touchpad, a mouse, and the like that are externally connected to the head-mounted device 100. The head-mounted device may be a smart bracelet, a smart watch, a smart helmet, a pair of electronic glasses, and the like.

Figure 19:
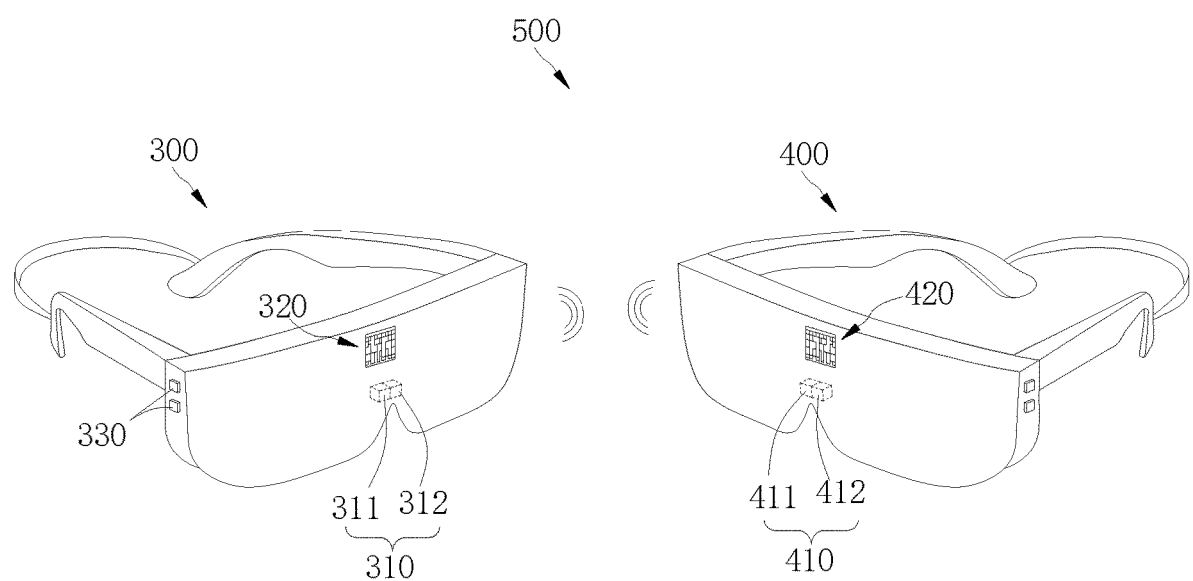
FIG. 19 is a schematic structural diagram of an interactive system according to an embodiment of the present disclosure.
Figure 20:
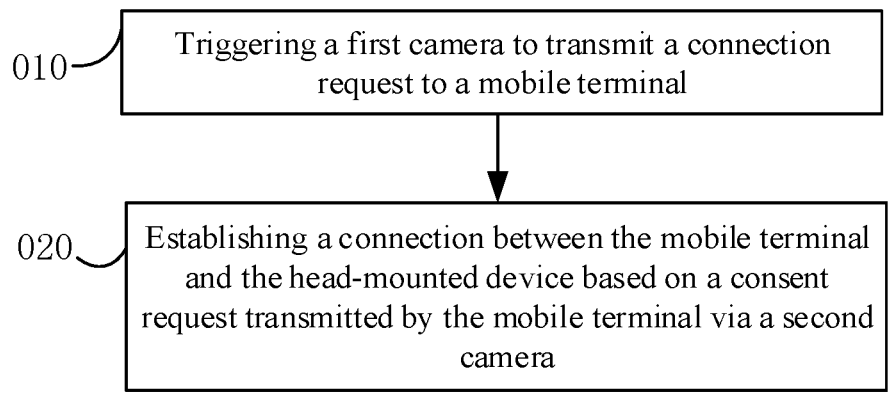
FIG. 20 is a flowchart of an interactive method according to an embodiment of the present disclosure.

Referring to FIG. 19 and FIG. 20, in an aspect of the present disclosure, an embodiment provides an interactive method for a head-mounted device 300. The interactive method is applied to an interaction between the head-mounted device 300 and a mobile terminal 400. For example, the mobile terminal 400 is an electronic device such as a mobile phone, a tablet computer, or a head-mounted device. In this case, the head-mounted device may be an AR device, a VR device, or an MR device. The head-mounted device 300 includes a first camera 310, and the mobile terminal 400 includes a second camera 410. The interactive method includes the following actions.

At block 010, the first camera 310 is triggered to transmit a connection request to the mobile terminal 400.

At block 020, a connection between the mobile terminal 400 and the head-mounted device 300 is established based on a consent request transmitted by the mobile terminal 400 via the second camera 410.

The above interactive method for the head-mounted device 300 can be implemented by the head-mounted device 300 according to the embodiments of the present disclosure. Specifically, the head-mounted device 300 according to the embodiments of the present disclosure is configured to interact with the mobile terminal 400. The head-mounted device 300 includes a first camera 310. The mobile terminal 400 includes a second camera 410. The head-mounted device 300 is configured to: trigger the first camera 310 to transmit a connection request to the mobile terminal 400; and establish a connection between the mobile terminal 400 and the head-mounted device 300 based on a consent request transmitted by the mobile terminal 400 via the second camera 410.

In the related art of mobile terminal, as an example, the mobile terminal may be a mobile phone; in a process of establishing a connection between two mobile phones, the user needs to perform a series of complicated operations, e.g., clicking on a touch screen on a first mobile phone to activate a relevant wireless connection switch, and selecting a model of a second mobile phone, before initiating a connection to the second mobile phone; and similarly, the second mobile phone can only be connected to the first mobile phone after these related operations are performed. In this way, the operations are cumbersome and complicate. Since the head-mounted lacks a touch screen and is worn on the head of the user, it is difficult for the user to operate the head-mounted device, which makes it difficult to apply a wireless connection of mobile phones to the head-mounted device.

In the head-mounted device 300 and the interactive method for the head-mounted device 300 according to the embodiments of the present disclosure, the first camera 310 and the second camera 410 enable the head-mounted device 300 to establish the connection with the mobile terminal 400, such that a process of establishing a connection between the head-mounted device 300 and the mobile terminal 400 has a higher automation level, is easier to operate, thereby improving the user experience.

Specifically, the head-mounted device 300 according to the embodiments of the present disclosure may be the head-mounted device 100 as mentioned in the above embodiments. In other words, the main features of the head-mounted device 300 can refer to those of the head-mounted device 100 according to the above embodiments, which is not described in detail herein.

The first camera 310 may be a depth camera or an environment camera, and the second camera 410 may be a depth camera or an environment camera. It can be understood that, as described above, when the first camera 310 is the environment camera, the first camera 310 can obtain image information. When the first camera 310 is the depth camera, the first camera 310 can transmit and receive waves of a certain frequency and phase. Features of the second camera 410 are similar to those of the first camera 310, and are not described in detail herein.

Therefore, the first camera 310 and the second camera 410 can transmit and receive external information to enable the interaction between the head-mounted device 300 and the mobile terminal 400 based on the information obtained by the first camera 310 and the second camera 410, thereby simplifying the user's operation process, making an interaction process between the head-mounted device 300 and the mobile terminal 400 simpler, and facilitating the establishment of the connection between the head-mounted device 300 and the mobile terminal 400.

In block 010, the first camera 310 may transmit the connection request to the mobile terminal 400 based on the information obtained by the first camera 310, or may initiate a connection based on the information transmitted by the first camera 310.

In block 020, said transmitting, by the mobile terminal 400, the consent request via the second camera 410 may refer to that the mobile terminal 400 transmits the consent request based on information captured and obtained by the second camera 410, or the mobile terminal 400 transmits the consent request transmitted based on information transmitted by the second camera 410.

It is possible to establish a wireless connection such as a Bluetooth connection, a near field communication connection, and a radio frequency connection between The head-mounted device 300 and the mobile terminal 400 can establish.

Figure 21:
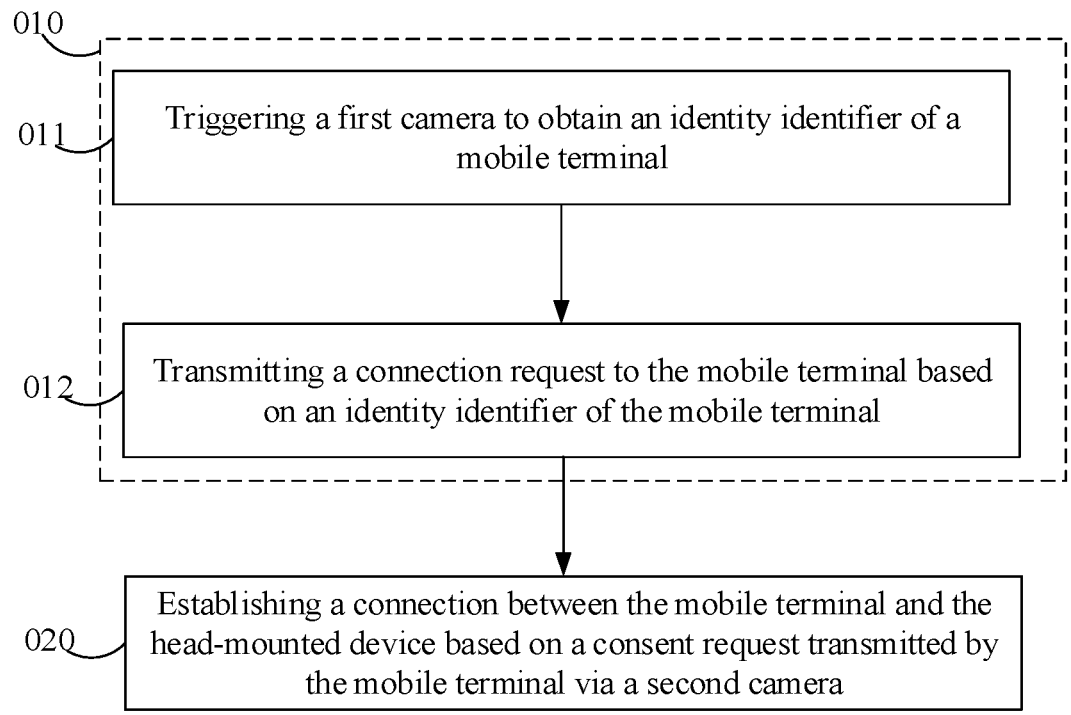
FIG. 21 is a flowchart of an interactive method according to an embodiment of the present disclosure.

Referring to FIG. 21, in some embodiments, the block 010 includes the following actions.

At block 011, the first camera 310 is triggered to obtain an identity identifier of the mobile terminal 400.

At block 012, the connection request is transmitted to the mobile terminal 400 based on the identity identifier of the mobile terminal 400, in which the consent request is generated based on an identity identifier of the head-mounted device 300 obtained by the second camera 410.

In some embodiments, the block 011 and the block 012 can be implemented by the head-mounted device 300. In other words, the head-mounted device 300 is configured to: obtain the identity identifier of the mobile terminal 400 via the first camera 310; and transmit the connection request to the mobile terminal 400 based on the identity identifier of the mobile terminal 400.

Specifically, the identity identifiers of the head-mounted device 300 and the mobile terminal 400 may be patterns, characters, structures, colors, and other identifying features. In an example, when the identity identifier of the mobile terminal 400 is a pattern, the pattern may be printed on a surface of the mobile terminal 400. In another example, when the identity identifier of the mobile terminal 400 is a structure, the structure may be a structure formed on a surface of the mobile terminal 400. For example, the structure can be a plurality of protrusions and/or grooves formed on the surface of the mobile terminal 400.

Therefore, at block 011, the first camera 310 can obtain the identity identifier of the mobile terminal 400 by shooting. Similarly, the second camera 410 can obtain the identity identifier of the head-mounted device 300 by shooting. At block 012, after obtaining the identity identifier of the mobile terminal 400, the head-mounted device 300 can accurately obtain the connection request to be transmitted to the mobile terminal 400. Further, the mobile terminal 400 can accurately transmit the consent request allowing the connection to the head-mounted device 300 based on the identity identifier of the head-mounted device 300 obtained by the second camera 410, such that the head-mounted device 300 and the mobile terminal 400 can be accurately paired with each other.

It should be noted that the identity identifier of the head-mounted device 300 can uniquely indicate an identity of the head-mounted device 300, and the identity identifier of the mobile terminal 400 can uniquely indicate an identity of the mobile terminal 400. That is, a relationship between the identity identifier of the head-mounted device 300 and the identity of the head-mounted device 300 is unique, and a relationship between the identity identifier of the mobile terminal 400 and the identity of the mobile terminal 400 is unique.

In an example, the identity identifier of the head-mounted device 300 can be bound to a media access control (MAC) address of the head-mounted device 300, such that the MAC address of the head-mounted device 300 can be obtained based on the identity identifier of the head-mounted device 300, thereby obtaining the identity of the head-mounted device 300. The identity of the mobile terminal 400 can be obtained in a similar manner, which is not described in detail herein.

In some embodiments, the block 011 includes: controlling the first camera 310 to scan an identification code 420 of the mobile terminal 400, in which the identification code 420 of the mobile terminal 400 is formed on an outer surface of the mobile terminal 400; and determining the identity identifier of the mobile terminal 400 based on the identification code 420 of the mobile terminal 400.

In some embodiments, the head-mounted device 300 is configured to: control the first camera 310 to scan the identification code 420 of the mobile terminal 400; and determine the identity identifier of the mobile terminal 400 based on the identification code of the mobile terminal 400.

Specifically, the identification code is, for example, an identification pattern such as a two-dimensional code and a bar code. It can be understood that the identification code includes various information. In the embodiments of the present disclosure, the identification code 320 of the head-mounted device 300 includes information in a unique relationship with the identity of the head-mounted device 300, and the identification code 420 of the mobile terminal 400 includes information in a unique relationship with the identity of the mobile terminal 400.

In this way, once the first camera 310 scans the identification code 420 of the mobile terminal 400, the head-mounted device 300 can identify the identity of the mobile terminal 400. Similarly, once the second camera 410 scans the identification code 320 of the head-mounted device 300, the mobile terminal 400 can identify the identity of the head-mounted device 300.

In some embodiments, prior to the action of controlling the first camera 310 to scan the identification code 420 of the mobile terminal 400, the interactive method includes: receiving an operation input; and activating the first camera 310 based on the operation input.

In some embodiments, the head-mounted device 300 is configured to: receive the operation input; and activate the first camera 310 based on the operation input.

In this way, an action of establishing the connection between the mobile terminal 400 and the head-mounted device 300 can be triggered based on the operation input. The operation input can be triggered by the user. For example, the user can press a button on the head-mounted device 300 to trigger the operation input, and the button can generate an instruction for triggering an activation of the first camera 310.

Figure 22:
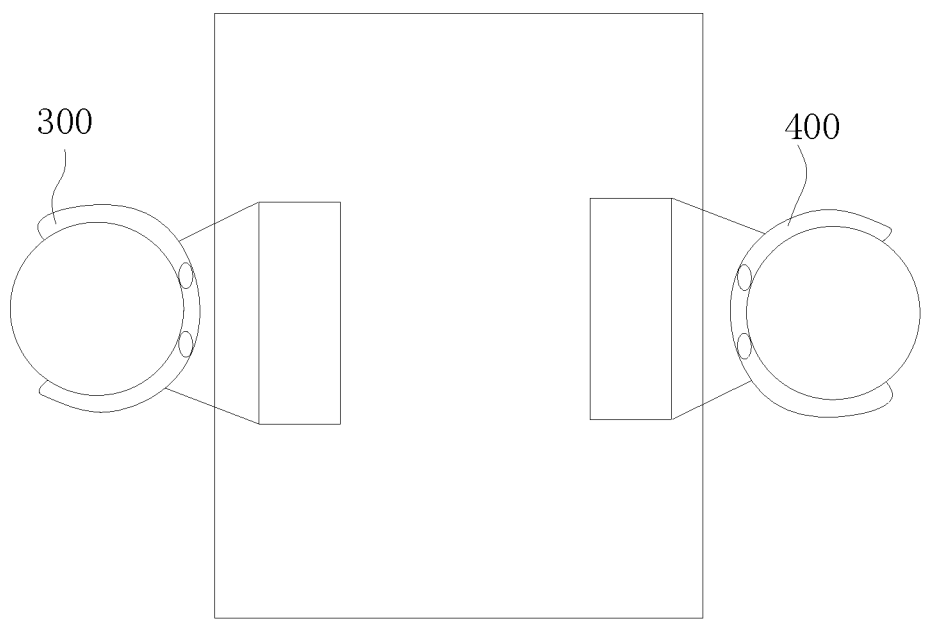
FIG. 22 is a flowchart of an interactive method according to an embodiment of the present disclosure.

Referring to FIG. 22, in an example, a process of establishing the connection between the head-mounted device 300 and the mobile terminal 400 is as follows. The user touches an input component 330 related to the head-mounted device 300 to activate the first camera 310, and directs the first camera 310 to the identification code 420 of the mobile terminal 400 in order to scan the identification code 420 of the mobile terminal 400. In this way, the head-mounted device 300 can identify the identity of the mobile terminal 400 and transmit the connection request to the mobile terminal 400. After the mobile terminal 400 receives the connection request, in a case that the user agrees to connect the mobile terminal 400 to the head-mounted device 300, the user scans the identification code 320 of the head-mounted device 300 with the second camera 410, such that the connection between the head-mounted device 300 and the mobile terminal 400 can be established.

Figure 23:
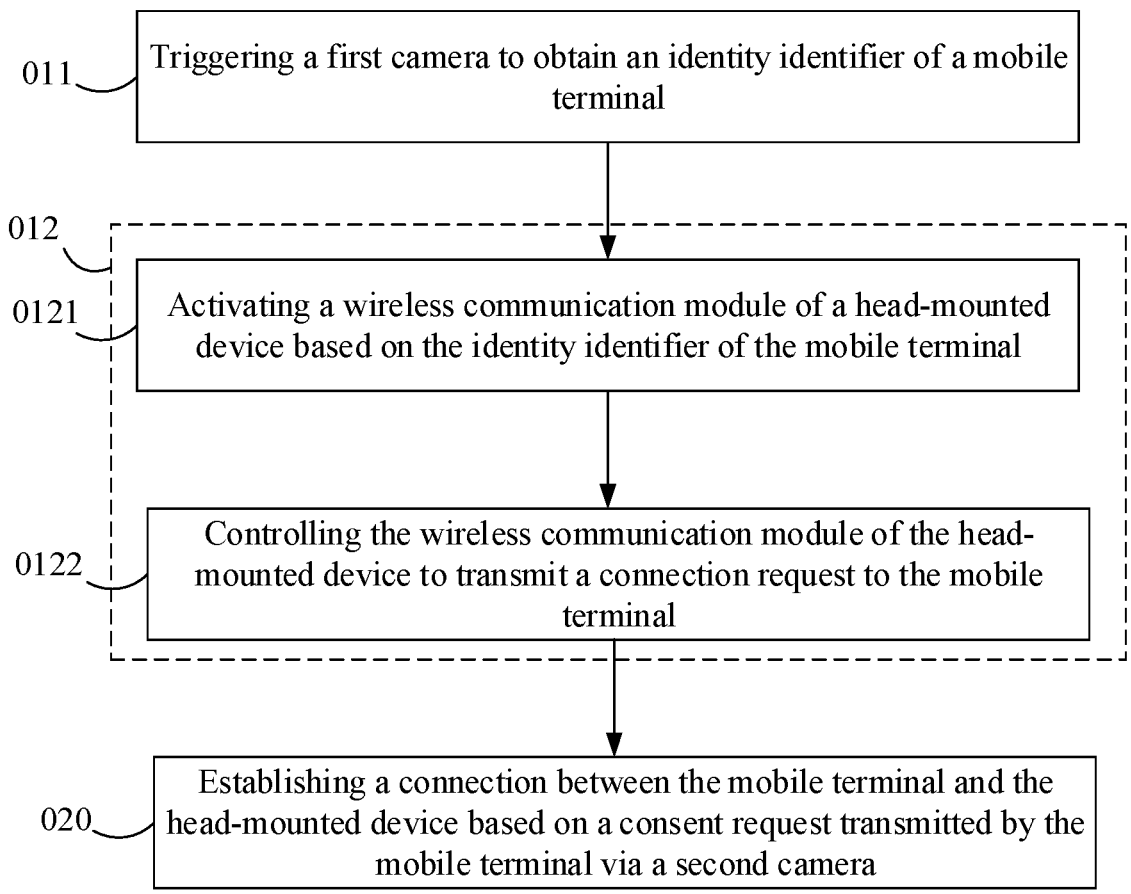
FIG. 23 is a flowchart of an interactive method according to an embodiment of the present disclosure.

Referring to FIG. 23, in some embodiments, the block 012 includes the following actions.

At block 0121, a wireless communication module of the head-mounted device 300 is activated based on the identity identifier of the mobile terminal 400.

At block 0122, the wireless communication module of the head-mounted device is controlled to transmit the connection request to the mobile terminal.

In some embodiments, the block 0121 and the block 0122 can be implemented by the head-mounted device 300. That is, the head-mounted device 300 is configured to: activate the wireless communication module of the head-mounted device 300 based on the identity identifier of the mobile terminal 400; and control the wireless communication module of the head-mounted device 300 to transmit the connection request to the mobile terminal 400.

In this way, the wireless communication module of the head-mounted device 300 can transmit a connection signal to enable the mobile terminal 400 to be connected to the head-mounted device 300. It can be understood that the mobile terminal 400 also includes a corresponding wireless communication module, allowing the mobile terminal 400 to communicate with the head-mounted device 300.

Figure 24:
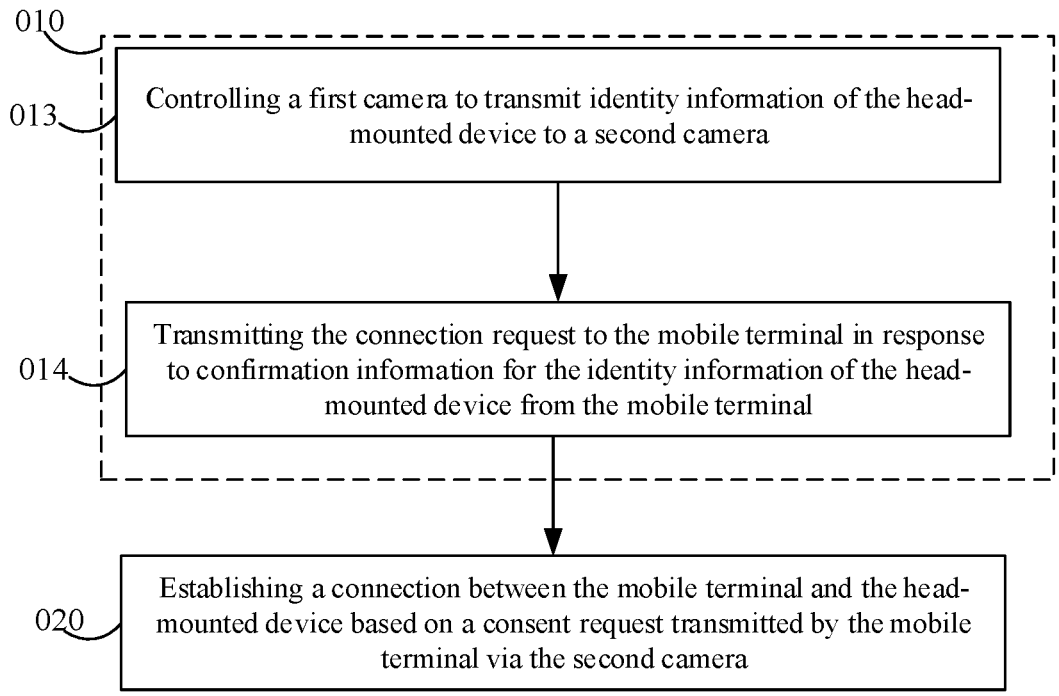
FIG. 24 is a schematic diagram of a scenario of an interactive method according to an embodiment of the present disclosure.

Referring to FIG. 24, in some embodiments, the block 010 includes the following actions.

At block 013, the first camera 310 is controlled to transmit identity information of the head-mounted device 300 to the second camera 410.

At block 014, the connection request is transmitted to the mobile terminal 400 in response to confirmation information for the identity information of the head-mounted device 300 from the mobile terminal 400. The consent request is generated based on the identity information of the head-mounted device 300 received by the second camera 410 and identity information of the mobile terminal 400, and the consent request is transmitted by the second camera 410.

In some embodiments, the block 013 and the block 014 can be implemented by the head-mounted device 300. That is, the head-mounted device 300 is configured to: control the first camera 310 to transmit the identity information of the head-mounted device 300 to the second camera 410; and transmit the connection request to the mobile terminal 400 in response to the confirmation information for the identity information of the head-mounted device 300 from the mobile terminal 400.

As described above, the first camera 310 and the second camera 410 can transmit waves, e.g., infrared rays. The first camera 310 can emit infrared rays of different frequencies and wavelengths to enable the infrared rays to be loaded with the identity information of the head-mounted device 300, and transmit the connection request based on the identity information of the head-mounted device 300. In this embodiment, both the first camera 310 and the second camera 410 are depth cameras. For example, both the first camera 310 and the second camera 410 are TOF cameras.

In this way, the head-mounted device 300 does not require complicated operations in a process of transmitting the connection request, thereby simplifying the connection between the head-mounted device 300 and the mobile terminal 400.

In some embodiments, the first camera 310 includes a first transmitting portion 311 and a first receiving portion 312, and the second camera 410 includes a second transmitting portion 411 and a second receiving portion 412. The block 013 includes: controlling the first transmitting portion 311 to transmit the identity information of the head-mounted device 300 to the second receiving portion 412.

The consent request is generated based on the identity information of the head-mounted device 300 received by the second receiving portion 412 and the identity information of the mobile terminal 400, and the consent request is transmitted via the second transmitting portion 411.

In some embodiments, the head-mounted device 300 is configured to control the first transmitting portion 311 to transmit the identity information of the head-mounted device 300 to the second receiving portion 412.

It should be noted that both the first transmitting portion 311 and the second transmitting portion 411 may be laser transmitters, and both the first receiving portion 312 and the second receiving portion 313 may be components with image sensors.

In an example, the process of establishing the connection between the head-mounted device 300 and the mobile terminal 400 is as follows. The user touches the input component 330 related to the head-mounted device 300 to activate the first camera 310, and the user directs the first transmitting portion 311 of the first camera 310 towards the second camera 410, in order to enable the first transmitting portion 311 to transmit the identity information of the head-mounted device 300 to the second receiving portion 412 and transmits the connection request to the mobile terminal 400. After the second receiving portion 412 receives the identity information of the head-mounted device 300 and the connection request, in a case that the user agrees to connect the mobile terminal 400 to the head-mounted device 300, the user controls the second transmitting portion 411 of the mobile terminal 400 to transmit the identity information of the mobile terminal 400 and the consent request allowing the connection to the head mounted device 300. After the first receiving portion 312 of the head-mounted device 300 receives the relevant information, the connection between the head-mounted device 300 and the mobile terminal 400 can be established.

It should be noted that, in such an embodiment, the connection request and the identity information of the head-mounted device 300 can be both transmitted through the first camera 310, and the consent request and the identity information of the mobile terminal 400 can be both transmitted through the second camera 410. A related application (APP) can be installed in both the head-mounted device 300 and the mobile terminal 400 to allow the user to trigger operations of the first camera 310 and the second camera 410, thereby establishing the connection between the head-mounted device 300 and the mobile terminal 400.

It should be noted that, in the above embodiments where the first camera 310 can scan the identification code, the transmitting portion in the first camera 310 can be omitted. Similarly, in the embodiments where the second camera 410 can scan the identification code, the transmitting portion in the second camera 410 can be omitted.

In some embodiments, the interactive method for the head-mounted device 300 further includes an action of transmitting a content displayed by the head-mounted device 300 to the mobile terminal 400 to allow the mobile terminal 400 to synchronously display the content displayed by the head-mounted device 300.

In some embodiments, the head-mounted device 300 is configured to transmit the content displayed by the head-mounted device 300 to the mobile terminal 400 to allow the mobile terminal 400 to synchronously display the content displayed by the head-mounted device 300. For example, when the head-mounted device 300 is an AR device, the head-mounted device 300 superimposes an image of a virtual object on a real environment and displays the image in the real environment. In this case, the head-mounted device 300 transmits the image of the virtual object and an image of the real environment to the mobile terminal 400 to enable the mobile terminal to display the image of the virtual object and the image of the real environment. In this way, the interactivity between the head-mounted device 300 and the mobile terminal 400 can be enhanced.

Figure 25:
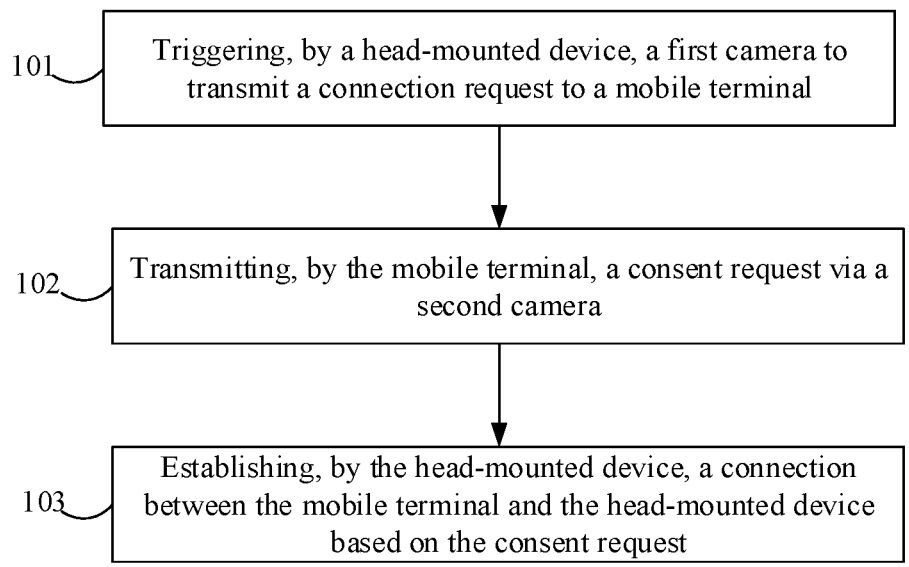
FIG. 25 is a flowchart of an interactive method according to an embodiment of the present disclosure.

Referring to FIG. 25, an embodiment of the present disclosure discloses an interactive method for an interactive system 500. The interactive system 500 includes a head-mounted device 300 and a mobile terminal 400. The head-mounted device 300 includes a first camera 310. The mobile terminal 400 includes a second camera 410. The interactive method includes the following actions.

At block 101, the head-mounted device 300 triggers the first camera 310 to transmit a connection request to the mobile terminal 400.

At block 102, the mobile terminal 400 triggers the second camera 410 to transmit a consent request.

At block 103, the head-mounted device 300 establishes a connection with the mobile terminal 400 based on the consent request.

The interactive method for the above interactive system 500 can be implemented by the interactive system 500 provided by the present disclosure. Specifically, the interactive system 500 according to the embodiment of the present disclosure includes the head-mounted device 300 and the mobile terminal 400. The head-mounted device 300 includes the first camera 310, and the mobile terminal 400 includes the second camera 410. The head-mounted device 300 is configured to trigger the first camera 310 to transmit the connection request to the mobile terminal 400. The mobile terminal 400 is configured to trigger the second camera 410 to transmit the consent request. The head-mounted device 300 is configured to establish the connection with the mobile terminal 400 based on the consent request.

In this way, in the interactive method for the interactive system 500 and the interactive system 500, the connection between the head-mounted device 300 and the mobile terminal 400 is established by using the first camera 310 and the second camera 410. Thus, a process of establishing the connection between the head-mounted device 300 and the mobile terminal 400 has a higher automation level, is easier to operate, thereby improving the user experience.

Figure 26:
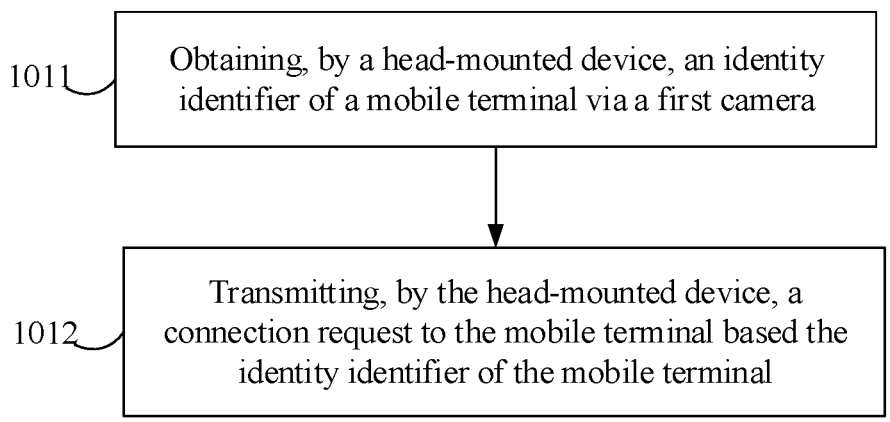
FIG. 26 is a flowchart of an interactive method according to an embodiment of the present disclosure.

Referring to FIG. 26, in some embodiments, the block 101 includes the following actions.

At block 1011, the head-mounted device 300 triggers the first camera 310 to obtain an identity identifier of the mobile terminal 400.

At block 1012, the head-mounted device 300 transmits the connection request to the mobile terminal 400 based the identity identifier of the mobile terminal 400.

Figure 27:
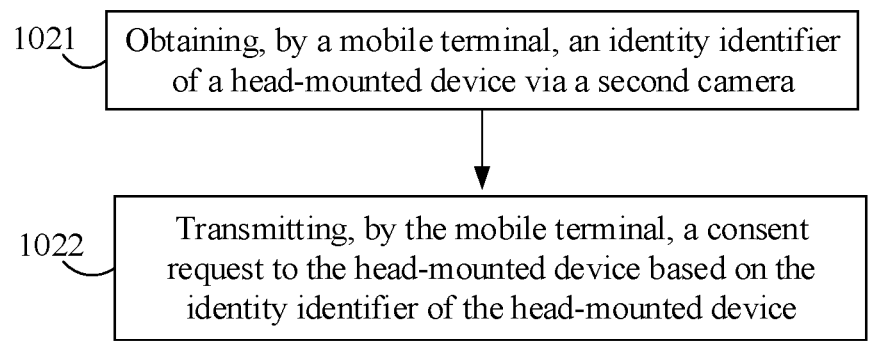
FIG. 27 is a flowchart of an interactive method according to an embodiment of the present disclosure.

Referring to FIG. 27, in some embodiments, the block 102 includes the following actions.

At block 1021, the mobile terminal 400 triggers the second camera 410 to obtain an identity identifier of the head-mounted device 300.

At block 1022, the mobile terminal 400 transmits the consent request to the head-mounted device 300 based on the identity identifier of the head-mounted device 300.

In this way, the mobile terminal 400 can accurately transmit the consent request allowing the connection to the head-mounted device 300 based on the identity identifier of the head-mounted device 300 obtained by the second camera 410, such that the head-mounted device 300 and the mobile terminal 400 can be accurately paired with each other.

In some embodiments, the block 1011 includes controlling, by the head-mounted device 300, the first camera 310 to scan the identification code 420 of the mobile terminal 400.

The block 1012 includes controlling, by the mobile terminal 400, the second camera 410 to scan the identification code 320 of the head-mounted device 300.

In this way, once the first camera 310 scans the identification code 420 of the mobile terminal 400, the head-mounted device 300 can identify the identity of the mobile terminal 400. Similarly, once the second camera 410 scans the identification code 320 of the head-mounted device 300, the mobile terminal 400 can identify the identity of the head-mounted device 300.

In some embodiments, the block 1012 includes: activating, by the head-mounted device 300, a wireless communication module of the head-mounted device 300 based on the identity identifier of the mobile terminal 400; and controlling, by the head-mounted device 300, the wireless communication module of the head-mounted device 300 to transmit the connection request to the mobile terminal 400.

In this way, the wireless communication module of the head-mounted device 300 can transmit a connection signal to enable the mobile terminal 400 to be connected to the head-mounted device 300. It can be understood that the mobile terminal 400 may also include a corresponding wireless communication module, allowing the mobile terminal 400 to communicate with the head-mounted device 300.

In some embodiments, the interactive method for the interactive system 500 further includes generating, by the mobile terminal 400, prompt information based on the connection request. The prompt information used for prompting the head-mounted device 300 to request for establishing the connection. In this way, the prompt information can remind and ask the user who is wearing the device whether it is necessary to establish a connection with other devices, so as to remind the user to deal with a corresponding matter timely.

The prompt information can be image information, text information, or sound information. For example, the display of the mobile terminal 400 may display text, for example, "Do you want to establish a connection with the head-mounted device 300", to remind the user to perform a corresponding operation.

Another embodiment of the present disclosure provides an interactive method for a mobile terminal 400. The interactive method for the mobile terminal 400 includes: receiving a connection request initiated by a first camera 310 of a head-mounted device 300 under triggering of the head-mounted device 300; and transmitting, by a second camera 410, a consent request based on the connection request for establishing a connection between the head-mounted device 300 and the mobile terminal 400.

In some embodiments, the mobile terminal 400 is configured to: receive the connection request initiated by the first camera 310 of the head-mounted device 300; and transmit, by the second camera 410, the consent request based on the connection request for establishing the connection between the head-mounted device 300 and the mobile terminal 400.

In this way, the mobile terminal 400 can accurately transmit the consent request allowing the connection with the head-mounted device 300 based on an identity identifier of the head-mounted device 300 obtained by the second camera 410, such that the head-mounted device 300 and the mobile terminal 400 can be accurately paired with each other.

It should be noted that the description of the interactive method for the head-mounted device 300 and the head-mounted device 300 according to the embodiments of the present disclosure is also suitable for the interactive method for the interactive system 500, the interactive system 500, the mobile terminal 400, and the interactive method for the mobile terminal 400 according to the above embodiments. Therefore, the description of a part of the interactive method for the interactive system 500, the interactive system 500, the mobile terminal 400, and the interactive method for the mobile terminal 400 can be referred to the description of a corresponding part of the interactive method for the head-mounted device 300 and the head-mounted device 300, which is not described in detail herein.

The present disclosure provides a non-volatile computer-readable storage medium including computer-executable instructions. The computer-executable instructions, when executed by one or more processors, cause one or more processors to implement the interactive method based on any one of the embodiments.

Those skilled in the art can understand that the structures illustrated in the drawings are only schematic diagrams of parts of structures related to the solutions of the present disclosure, and do not constitute limitations on the head-mounted device to which the solutions of the present disclosure are applied. A specific head-mounted device may include more or fewer components than those illustrated in the drawings, a combination of certain components, or have a different arrangement of components.

Throughout the present disclosure, description with reference to "an embodiment," "some embodiments," "illustrative embodiments," "an example," "a specific example," or "some examples," means that a particular feature, structure, material, or characteristic described in connection with the embodiment or example is included in at least one embodiment or example of the present disclosure. The appearances of the above phrases in various places throughout the present disclosure are not necessarily referring to the same embodiment or example of the present disclosure. Furthermore, the particular features, structures, materials, or characteristics described here may be combined in any suitable manner in one or more embodiments or examples of the present disclosure.

Although the embodiments of present disclosure have been explained and described as above, it can be appreciated by those skilled in the art that changes, alternatives, and modifications can be made to the embodiments without departing from the principle and spirit of the present disclosure. The scope of the present disclosure is defined by the claims as attached and their equivalents.

What is claimed is:

1. An interactive method, applied in a head-mounted device, the head-mounted device comprising a first camera, the mobile terminal comprising a second camera, and the interactive method comprising:
    triggering the first camera to transmit a connection request to the mobile terminal; and
    establishing a connection between the mobile terminal and the head-mounted device based on a consent request transmitted by the mobile terminal via the second camera,
    wherein said triggering the first camera to transmit the connection request to the mobile terminal comprises:
    controlling the first camera to transmit identity information of the head-mounted device to the second camera; and
    transmitting the connection request to the mobile terminal in response to confirmation information for the identity information of the head-mounted device from the mobile terminal, wherein the consent request is generated based on the identity information of the head-mounted device received by the second camera and identity information of the mobile terminal, and the consent request is transmitted by the second camera.

2. The interactive method according to claim 1, further comprising, subsequent to establishing the connection between the mobile terminal and the head-mounted device:
    transmitting a content displayed by the head-mounted device to the mobile terminal to allow the mobile terminal to synchronously display the content displayed by the head-mounted device.

3. A non-transitory storage medium, comprising computer-executable instructions, wherein the computer-executable instructions, when executed by one or more processors, cause one or more processors to implement the interactive method according to claim 1.

4. A head-mounted device, configured to interact with a mobile terminal and comprising a first camera, wherein the mobile terminal comprises a second camera, and the head-mounted device is configured to:
    trigger the first camera to transmit a connection request to the mobile terminal; and
    establish a connection between the mobile terminal and the head-mounted device based on a consent request transmitted by the mobile terminal via the second camera,
    wherein the head-mounted device is further configured to:
    control the first camera to transmit identity information of the head-mounted device to the second camera; and
    transmit the connection request to the mobile terminal in response to confirmation information for the identity information of the head-mounted device from the mobile terminal, wherein the consent request is generated based on the identity information of the head-mounted device received by the second camera and identity information of the mobile terminal, and the consent request is transmitted by the second camera.

5. The head-mounted device according to claim 4, further configured to:
transmit a content displayed by the head-mounted device to the mobile terminal to allow the mobile terminal to synchronously display the content displayed by the head-mounted device.

6. The head-mounted device according to claim 4, comprising:
a housing;
a sensor assembly disposed in the housing and comprising the first camera; and
an electrochromic device disposed in the housing and is arranged to cover the sensor assembly.

7. The head-mounted device according to claim 6, wherein the electrochromic device is configured to shield or expose the sensor assembly by changing a light transmittance thereof based on a state of the head-mounted device.

8. The head-mounted device according to claim 6, further comprising:
a display;
a light-guiding component provided separately from the display and configured to guide light generated by the display; and
a light quantity adjustment component.

9. The head-mounted device according to claim 8, wherein the light-guiding component has a first side, and a second side opposite to the first side, the light quantity adjustment component is disposed on the second side and configured to adjust an amount of ambient light incident on the second side.

10. The head-mounted device according to claim 8, wherein the electrochromic element comprises, sequentially stacked, a first conductive layer, a second conductive layer, an electrochromic layer disposed between the first conductive layer and the second conductive layer, an electrolyte layer, and an ion storage layer; the first conductive layer and the second conductive layer are configured to provide an electrochromic voltage to the electrochromic layer, allowing a change of a light transmittance of the electrochromic element.

11. An interactive method, applied in a mobile terminal, the interactive method comprising:
receiving a connection request initiated by a first camera of a head-mounted device under triggering of the head-mounted device; and
transmitting, by a second camera of the mobile terminal, a consent request based on the connection request for establishing a connection between the head-mounted device and the mobile terminal,
wherein said triggering the first camera to transmit the connection request to the mobile terminal comprises:
controlling the first camera to transmit identity information of the head-mounted device to the second camera; and
transmitting the connection request to the mobile terminal in response to confirmation information for the identity information of the head-mounted device from the mobile terminal, wherein the consent request is generated based on the identity information of the head-mounted device received by the second camera and identity information of the mobile terminal, and the consent request is transmitted by the second camera.

12. A non-transitory computer-readable storage medium, comprising computer-executable instructions, wherein the computer-executable instructions, when executed by one or more processors, cause one or more processors to implement the interactive method according to claim 11.

* * * * *